US012069128B2

(12) United States Patent
Einkauf et al.

(10) Patent No.: US 12,069,128 B2
(45) Date of Patent: *Aug. 20, 2024

(54) AUTOMATIC SCALING OF RESOURCE INSTANCE GROUPS WITHIN COMPUTE CLUSTERS

(71) Applicant: Amazon Technologies, Inc., Seattle, WA (US)

(72) Inventors: Jonathan Daly Einkauf, Seattle, WA (US); Luca Natali, Kirkland, WA (US); Bhargava Ram Kalathuru, Seattle, WA (US); Saurabh Dileep Baji, Seattle, WA (US); Abhishek Rajnikant Sinha, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 65 days.

This patent is subject to a terminal disclaimer.

(21) Appl. No.: 17/352,065

(22) Filed: Jun. 18, 2021

(65) Prior Publication Data

US 2021/0392185 A1    Dec. 16, 2021

Related U.S. Application Data

(63) Continuation of application No. 16/805,412, filed on Feb. 28, 2020, now Pat. No. 11,044,310, which is a (Continued)

(51) Int. Cl.
*H04L 41/0893* (2022.01)
*G06F 9/50* (2006.01)
(Continued)

(52) U.S. Cl.
CPC ........ *H04L 67/1076* (2013.01); *G06F 9/5077* (2013.01); *G06F 9/5083* (2013.01); (Continued)

(58) Field of Classification Search
CPC .................. H04L 41/0893–0897; H04L 41/22
See application file for complete search history.

(56) References Cited

U.S. PATENT DOCUMENTS 8,260,840 B1    9/2012  Sirota et al.
8,595,262 B1   11/2013  Hayden
(Continued)

FOREIGN PATENT DOCUMENTS

CN    102868763    1/2013
CN    103593243    2/2014
(Continued)

OTHER PUBLICATIONS

Barr, Jeff, Attila Narin, and Jinesh Varia. "Building fault-tolerant applications on AWS." Amazon Web Services (2011): 1-15.*
(Continued)

*Primary Examiner* — Brendan Y Higa
(74) *Attorney, Agent, or Firm* — Robert C. Kowert; Kowert, Hood, Munyon, Rankin & Goetzel, P.C.

(57) ABSTRACT

A service provider may apply customer-selected or customer-defined auto-scaling policies to a cluster of resources (e.g., virtualized computing resource instances or storage resource instances in a MapReduce cluster). Different policies may be applied to different subsets of cluster resources (e.g., different instance groups containing nodes of different types or having different roles). Each policy may define an expression to be evaluated during execution of a distributed application, a scaling action to take if the expression evaluates true, and an amount by which capacity should be increased or decreased. The expression may be dependent on metrics emitted by the application, cluster, or resource instances by default, metrics defined by the client and emitted by the application, or metrics created through aggregation. Metric collection, aggregation and rules evaluation may be performed by a separate service or by cluster
(Continued)

components. An API may support auto-scaling policy definition.

20 Claims, 17 Drawing Sheets

Related U.S. Application Data continuation of application No. 15/845,855, filed on Dec. 18, 2017, now Pat. No. 10,581,964, which is a continuation of application No. 14/702,080, filed on May 1, 2015, now Pat. No. 9,848,041.

(51) Int. Cl.
| | |
|---|---|
| H04L 41/0894 | (2022.01) |
| H04L 41/0897 | (2022.01) |
| H04L 41/22 | (2022.01) |
| H04L 41/5041 | (2022.01) |
| H04L 43/0876 | (2022.01) |
| H04L 67/10 | (2022.01) |
| H04L 67/1031 | (2022.01) |
| H04L 67/1074 | (2022.01) |

(52) U.S. Cl.
CPC ...... *H04L 41/0893* (2013.01); *H04L 41/0894* (2022.05); *H04L 41/0897* (2022.05); *H04L 41/22* (2013.01); *H04L 41/5045* (2013.01); *H04L 43/0876* (2013.01); *H04L 67/10* (2013.01); *H04L 67/1031* (2013.01)

(56) References Cited

U.S. PATENT DOCUMENTS

| | | | |
|---|---|---|---|
| 8,880,678 B1 | 11/2014 | Colton et al. | |
| 9,372,735 B2 | 6/2016 | Calder et al. | |
| 9,804,890 B1* | 10/2017 | Pai | G06F 9/5061 |
| 9,848,041 B2 | 12/2017 | Einkauf et al. | |
| 9,851,988 B1* | 12/2017 | Elisha | G06F 9/50 |
| 9,871,745 B2 | 1/2018 | Steinder et al. | |
| 9,912,607 B2 | 3/2018 | Steinder et al. | |
| 9,971,621 B1* | 5/2018 | Berg | G06F 9/5077 |
| 9,990,499 B2 | 6/2018 | Chan et al. | |
| 10,581,964 B2 | 3/2020 | Einkauf et al. | |
| 11,044,310 B2 | 6/2021 | Einkauf et al. | |
| 11,310,116 B2* | 4/2022 | Mehta | G06Q 10/00 |
| 2002/0049859 A1 | 4/2002 | Bruckert et al. | |
| 2003/0065703 A1 | 4/2003 | Aborn | |
| 2007/0237162 A1 | 10/2007 | Hamanaka et al. | |
| 2010/0153524 A1 | 6/2010 | Rehm et al. | |
| 2010/0185823 A1 | 7/2010 | De et al. | |
| 2010/0268764 A1 | 10/2010 | Wee et al. | |
| 2010/0313063 A1 | 12/2010 | Venkataraja et al. | |
| 2011/0099403 A1 | 4/2011 | Miyata et al. | |
| 2012/0072571 A1* | 3/2012 | Orzell | G06F 11/008 |
| | | | 718/1 |
| 2012/0254443 A1 | 10/2012 | Ueda | |
| 2012/0271926 A1 | 10/2012 | Shakirzyanov et al. | |
| 2013/0024554 A1 | 1/2013 | Jian et al. | |
| 2013/0054776 A1* | 2/2013 | Kunze | G06F 9/5061 |
| | | | 709/224 |
| 2013/0086273 A1* | 4/2013 | Wray | G06F 9/5072 |
| | | | 709/226 |
| 2013/0227558 A1 | 8/2013 | Du et al. | |
| 2013/0254384 A1 | 9/2013 | Wray | |
| 2013/0262677 A1* | 10/2013 | Olsen | H04L 67/1097 |
| | | | 709/226 |
| 2013/0290249 A1 | 10/2013 | Merriman et al. | |
| 2014/0149590 A1 | 5/2014 | Mallipeddi et al. | |
| 2014/0280488 A1 | 9/2014 | Voit et al. | |
| 2014/0282591 A1 | 9/2014 | Stich et al. | |
| 2014/0379901 A1* | 12/2014 | Tseitlin | H04L 43/08 |
| | | | 709/224 |
| 2015/0058843 A1 | 2/2015 | Holler et al. | |
| 2015/0089064 A1 | 3/2015 | Salle et al. | |
| 2015/0095448 A1 | 4/2015 | Hwang | |
| 2015/0281113 A1 | 10/2015 | Siciliano et al. | |
| 2015/0304176 A1* | 10/2015 | Ting | G06F 9/5083 |
| | | | 709/203 |
| 2015/0339150 A1 | 11/2015 | Yanagisawa et al. | |
| 2016/0134557 A1 | 5/2016 | Steinder et al. | |
| 2016/0134558 A1 | 5/2016 | Steinder et al. | |
| 2016/0204923 A1* | 7/2016 | Ashok | G06F 9/45558 |
| | | | 709/226 |
| 2018/0069806 A1 | 3/2018 | Kumar | |

FOREIGN PATENT DOCUMENTS

| | | |
|---|---|---|
| CN | 103605613 | 2/2014 |
| CN | 103731289 | 4/2014 |
| CN | 104243537 | 12/2014 |
| EP | 2804101 | 11/2014 |
| JP | 2012208781 | 10/2012 |
| JP | 2015507279 | 3/2015 |
| WO | 2013106204 | 7/2013 |

OTHER PUBLICATIONS

Summons Mailed Mar. 10, 2022 in European Patent Application No. 16724173.6.
Amazon Web Services, "Auto Scaling: Developer Guide", Jan. 1, 2011, Retrieved from the Internet: URL:https://s3.cn-north-1.amazonaws.com.cn/aws-dam-prod/china/pdf/as-dg.pdf.
Amazon Web Services, "Managing Your AWS Infrastructure at Scale", Feb. 1, 2015, Retrieved from the Internet: URL:https://d1.awsstatic.com/whitepapers/managing-your-awsinfrastructure-at-scale.pdf.
http://www.qubole.com/features/, "Big Data platform tools and benefits | Qubole", Downloaded Apr. 9, 2015, pp. 1-8.
International Search Report and Written Opinion from PCT/US/2016/029967, Date of mailing Jul. 21, 2016, Amazon Technologies, Inc., pp. 1-12.
J. Dean, et al., "MapReduce: Simplified Data Processing on Large Clusters", Sixth Symposium on Operationg System Design and Implementation (OSDI04), 2004, pp. 1-13.
Office Action from Japanese Application No. 2017-557038, (English Translation and Japanese Version) Dated Dec. 18, 2018, pp. 1-27.
Office Action in European Application No. 16724173.6 mailed Apr. 19, 2021, Amazon Technologies, Inc., pp. 1-11.
Romer, Toomas, "Autoscaling Hadoop Clusters," Doctoral dissertation, Masters Theses, University of Tartu, May 1, 2010, pp. 1-42, Tartu, Estonia (retrieved from internet: http://kodu.ut.ee/~srirama/publications/theses/AutoscaleHadoop_Toomas.pdf).
Office action and Search report from Japanese Application No. 201680025436.3, (English Translation and Japanese version), dated Mar. 16, 2020, pp. 1-36.
Caballer, et al., "EC3: elastic cloud computing cluster", Journal of Computer and System Science, 2013, pp. 1341-1351.

\* cited by examiner

AUTOMATIC SCALING OF RESOURCE INSTANCE GROUPS WITHIN COMPUTE CLUSTERS

This application is a continuation of U.S. patent application Ser. No. 16/805,412, filed Feb. 28, 2020, which is a continuation of U.S. patent application Ser. No. 15/845,855, filed Dec. 18, 2017, now U.S. Pat. No. 10,581,964, which is a continuation of U.S. patent application Ser. No. 14/702,080, filed May 1, 2015, now U.S. Pat. No. 9,848,041, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. Examples of such large-scale systems include online merchants, internet service providers, online businesses such as photo processing services, corporate networks, cloud computing services (including high-performance computing services for executing large and/or complex computations), web-based hosting services, etc. These entities may maintain computing resources in the form of large numbers of computing devices (e.g., thousands of hosts) which are housed in geographically separate locations and which are configured to process large quantities (e.g., millions) of transactions daily or even hourly.

The advent of virtualization technologies for commodity hardware has provided benefits with respect to managing large-scale computing resources for many customers with diverse service needs, allowing various computing resources and services to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

One conventional approach for harnessing these resources to process data is the MapReduce model for distributed, parallel computing. In a MapReduce system, a large data set may be split into smaller chunks, and the smaller chunks may be distributed to multiple computing nodes in a cluster for the initial "map" stage of processing. Multiple nodes may also carry out a second "reduce" stage of processing based on the results of the map stage. In various cluster-based distributed computing systems, including some that implement MapReduce clusters, data to be accessed by compute nodes in a cluster may be stored within the virtualized resource instances of the cluster and/or in data storage systems that are separate from the virtualized resource instances of the cluster. In existing systems that implement MapReduce clusters, capacity may typically only be added or removed manually (e.g., as an individual stand-alone operation) by calling an API of the system, typically through the command-line interface. Therefore, MapReduce clusters are often under- or over-provisioned, resulting in delays (due to under-provisioning) or waste (due to over-provisioning).

Figure 1:
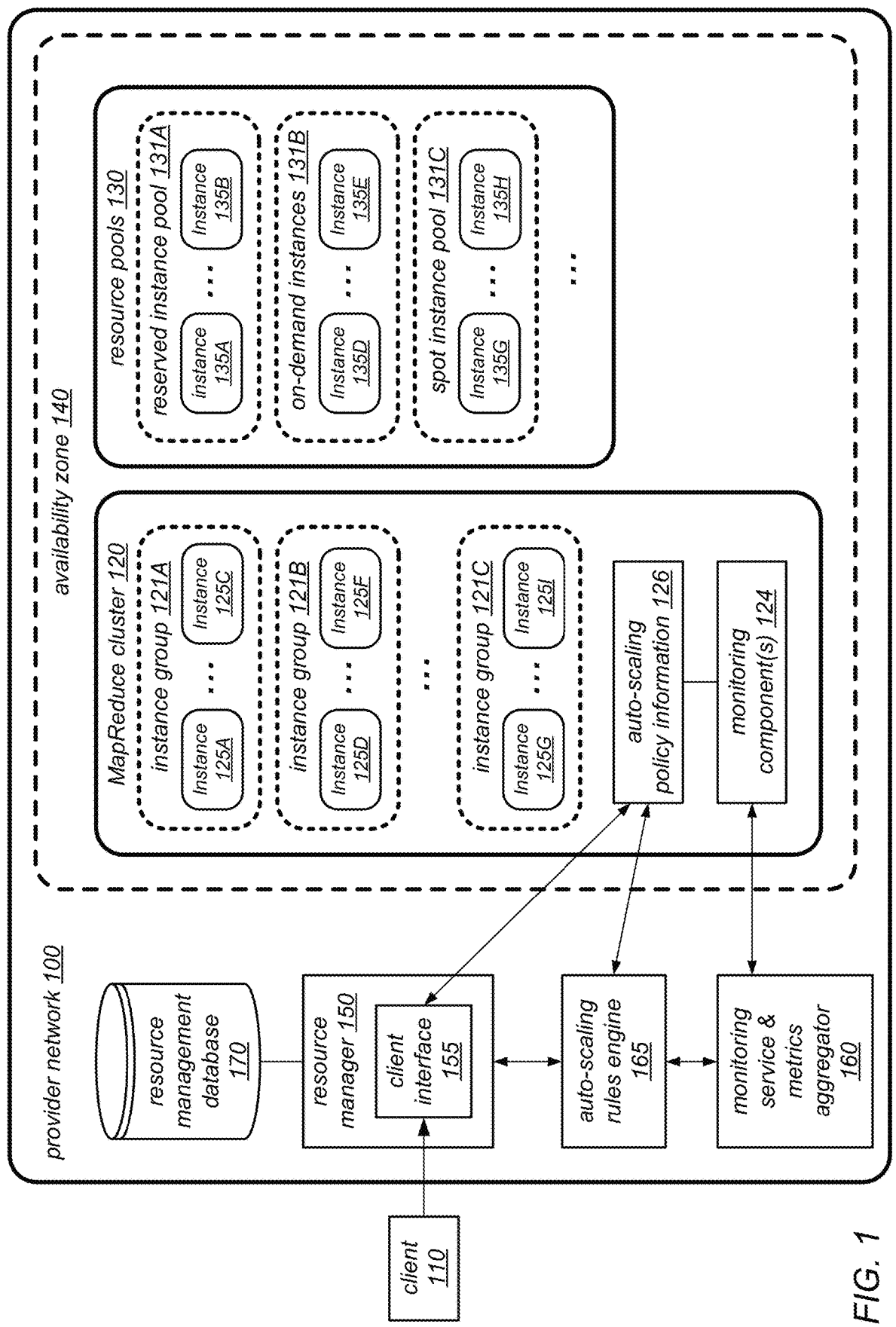
FIG. 1 is a block diagram illustrating one embodiment of a service provider system that implements automatic scaling of a MapReduce cluster.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Various embodiments of methods and apparatus for implementing automatic scaling of computing resource instances in a cluster-based distributed computing system (e.g., the Apache™ Hadoop® framework) are described herein. In some embodiments, these techniques may be applied automatically (e.g., programmatically) by the distributed computing service in response to a request from a client (e.g., a client application, through which an end user, service subscriber, or third party service that is a customer of the service interacts with the service) to enable automatic scaling of the cluster. As described in more detail herein, a client may define metrics to be monitored during execution of an application on the cluster and may define or select an auto-scaling policy that includes an auto-scaling trigger condition (e.g., a condition that is dependent on the monitored metrics). In some embodiments, the policy may define a scaling action to be taken when the condition is met, may specify an amount by which capacity in the cluster (or a subset thereof) should be increased or decreased, and may identify the portion of the cluster to which the policy applies.

Workloads in the Hadoop framework tend to be very spikey in nature, are often batch oriented, and may consume a lot of resources within a certain period of time, then scale down their resource needs. In addition, the resources in distributed computing systems (e.g., cloud-based system) are somewhat fungible in that a process may get resources when they are needed and the throw them away. The systems and methods described herein may be used to manage computing resource instances in systems that employ both of these models. For example, they may be used to programmatically scale a cluster up or down based on the workload. In some embodiments, service provider customers who do not know how much capacity they will need may create a small cluster (e.g., one with only one or two nodes) and, by enabling auto-scaling as described herein, may allow the system to determine when and if to scale up based on the actual demand (rather than trying to size it correctly at creation based on a blind estimate).

Existing auto-scaling solutions are typically designed for stateless workloads in systems with homogeneous nodes (e.g., nodes all running the same software). For example, they may be used to scale a web front-end where data loss is not an issue. However, a MapReduce cluster may be partially stateless and partially stateful, with some groups of nodes that contain data and other groups of nodes that do not. Therefore, existing auto-scaling approaches may not be suitable in this context, in which the impact of losing data (state) can be high. In some embodiments, the auto-scaling techniques described herein may be configured to consider the possibility of data loss and/or job failures when scaling (e.g., when reducing the cluster capacity). These techniques may be used to minimize job rescheduling and reduce the odds of data loss. In some embodiments, different types of compute engines may run within a container service on a cluster of computing resource instances, each of which has its own behaviors and peculiarities that should be taken into account during cluster scaling. For example, some clusters may implement a MapReduce or Hadoop framework, which is one type of engine. Other clusters may run an engine based on the Spark™ framework from Apache or the Presto SQL query engine from Facebook, Inc. Because these example engines do not use a MapReduce approach, they have different concepts for treating state within a cluster, different ways to define statefulness or statelessness, and different penalties for losing state than in MapReduce clusters. Therefore, the auto-scaling policies for these different engines may have different ways of managing state information, different indications of scale, different indications of job progress, and/or different key indicators for deciding when and if to scale the underlying cluster than those used in a MapReduce cluster.

In some embodiments of the systems described herein, different auto-scaling policies may be applied to different clusters and/or to different nodes in the cluster (or to different groups of nodes in the cluster), and the systems may avoid removing a node during an operation to reduce capacity if the node stores important state information (e.g., if it stores data and it cannot be gracefully decommissioned), or if it would otherwise be inconsistent with the behavior of a distributed application or engine being executed on the cluster. In other words, unlike in existing auto-scaling solutions, the systems described herein may apply intelligence in scaling operations due to the unique behaviors of at least some of the nodes, rather than treating all the nodes in the cluster the same way for scaling purposes.

Rather than relying primarily on standard indicators of performance in the machine (e.g., relying on CPU and memory and I/O performance indicators and scaling up when one of the spikes) when making scaling decisions, as in existing solutions, the systems described herein may employ heuristics that are chosen by the application provider and/or that delve deeper into the particular activities of the application when making scaling decisions (e.g., number of pending containers, what percentage of the job is complete, can the job be finished in the current cluster without scaling it up or not, etc.). In some embodiments, the systems described herein may employ more configurable (and/or customer-driven) auto-scaling policies, and may also implement some built-in safety features to avoid performing counterproductive auto-scaling policies that are defined by the customer.

As previously noted, distributed applications that are implemented in a MapReduce framework may require a different approach to auto-scaling than other distributed applications. For example, for most of these applications, there exists the concept of a master node, and there are groups of worker nodes in the cluster. The master node behaves very differently from the worker nodes (e.g., data nodes). With such applications, an auto-scaling policy for the cluster should refrain from removing the master node, for example.

In some embodiments, the MapReduce cluster (e.g., a Hadoop cluster), may include a distributed file system (e.g., the Hadoop Distributed File System, or HDFS). An operator of the cluster may wish to add storage capacity to the cluster if utilization of the file system exceeds a predetermined threshold. The systems described herein may allow the operator to create an auto-scaling policy so that if utilization exceeded 80%, the system would, automatically (e.g., programmatically) add capacity on behalf of the operator. Conversely, customers who launch clusters very often have the problem that the cluster (or a particular node thereof) is not doing anything and it is forgotten about. The systems described herein may allow the customer to define an auto-scaling policy that would reduce capacity (or shut down the cluster entirely) based on certain rules. For example, if a monitoring process observed that there was no CPU utilization for a certain period of time or that the number of jobs was zero for a certain period of time, it may be configured (through a customer-defined auto-scaling policy) to trigger a scaling operation that would reduce the capacity of the cluster or shut the cluster down without the cluster operation having to remember to scale the cluster down or terminate it. In other words, in some embodiments, auto-scaling rules may include a time component in addition to (or instead of) other default or custom cluster-level, node-level, or application level metrics. For example, a customer may be able to specify that a cluster should scale up when HDFS utilization is greater than 90% for more than 2 hours, and that it should scale down if the cluster is idle for more than 1 hour. In some embodiments, automatic cluster scaling may allow service provider customers to reduce their costs (e.g., by removing excess capacity) and helps them meet their own performance targets or service level agreements (e.g., by automatically adding capacity when there is significant demand). In some embodiments, customers may be able to define an auto-scaling policy specifying that a cluster should automatically scale up or down on a certain day of the week (or date) and/or at a certain time of day, when a particular threshold for a default or custom metric is exceeded for a given period of time, when the estimated time to complete all pending jobs exceeds a specified service level agreement, or according to other auto-scaling rules.

In some embodiments, customers may not specify their own rules, but the system may apply default rules that are set by the distributed computing system or the service provider. For example, some systems may include a default auto-scaling rule specifying that if HDFS utilization exceeds a default maximum utilization threshold for more than a default number hours, the system will automatically add HDFS capacity to the cluster. In some embodiments, the auto-scaling techniques described herein may help customers ensure that they always have the right amount of capacity in their clusters. In some embodiments, the auto-scaling rules may include a cost metric. For example, a customer may define an auto-scaling policy specifying a period during which the customer would like the capacity to be scaled up and a maximum cost that the customer is willing to pay for increased capacity, and the system may be configured to increase capacity of the cluster during that period only if it can do so without exceeding the specified maximum cost (e.g., by taking advantage of on-demand or spot market pricing for the additional resource instances that is below a predetermined cost threshold). In another example, a customer may define an auto-scaling policy specifying that capacity should be maintained at a particular utilization level or that capacity should be increased as much as possible while keeping the cost per hour below a pre-determined maximum cost. In some such embodiments, instance pricing may be evaluated once per hour, and capacity may be added or removed after each evaluation in which a price change affects the capacity that can be obtained without exceeding that cost threshold. In some embodiments, an auto-scaling policy may include other types of goal-based or target-based rules. In some embodiments, in response to a cluster failure, a new cluster may be brought up to replace it and the new cluster may be automatically scaled up over time to accommodate a growing workload.

As described in more detail later, the systems described herein may support the use of customer-defined auto-scaling policies that are targeted to particular instance groups within a distributed computing cluster (such as a MapReduce cluster), and these policies may include auto-scaling rules that are dependent on any combination of default and/or custom (user-defined) metrics that are emitted or otherwise made available to an auto-scaling rules engine along with other types of triggers (e.g., time, day, date, or cost triggers). For example, any of the default metrics emitted by the Hadoop framework, by Hadoop Yarn (a job scheduling and cluster resource management component of a Hadoop framework that emits metrics giving insight into the amount of work pending for each job or the number of pending jobs per container), or by HDFS (which emits metrics such as available capacity and remaining capacity) may be used (with or without additional custom metrics) in the expressions within an auto-scaling policy that define auto-scaling trigger conditions. As described in more detail below, the auto-scaling techniques may determine which nodes are eligible for removal when reducing capacity in a cluster based on their types, roles, behavior and/or the workloads they are configured to accommodate, in some embodiments. For example, in some embodiments, one or more instance groups may include Core nodes (e.g., nodes that are designed to have storage and execute jobs) and one or more other instance groups that include Task nodes (e.g., nodes are designed only for managing jobs). In some embodiments, various nodes in a MapReduce cluster may be running a different set of daemons, and the set of daemons running on each node may be determined based on the instance group to which the node belongs. In some embodiments, the systems may determine an order in which to terminate nodes when scaling down based on whether they store data, based on whether they are currently executing a task on behalf of a distributed application, or based on the relative progress of tasks executing on different nodes on behalf of the distributed application, in different embodiments.

As previously noted, the techniques described herein may provide auto-scaling in a way that is customizable by the user to fit their particular application and cluster architecture. For example, HDFS utilization (a storage utilization metric) may be a useful metric for making auto-scaling decisions in Hadoop clusters (e.g., to trigger operations to add or remove storage nodes, which are sometimes referred to herein as Core nodes), including Hadoop clusters that are configured to perform batch processing of logs (where the customer does not want to run out of capacity). However, in a system that employs a Presto SQL application for analytics (which is largely memory bound), a more interesting metric for use in making auto-scaling decisions (i.e., to manage cluster-wide memory capacity) may be memory utilization (e.g., "overall memory available"). In such a system, the user may want to have fine-grained control over the rules that trigger a resizing of the cluster.

FIG. 1 is a block diagram illustrating one embodiment of a service provider system that implements automatic scaling of a MapReduce cluster, as described herein. In this example, provider network 100 includes a MapReduce cluster 120, and additional resources within resources pools 130, in an availability zone 140 (e.g., in a particular region or facility). In other embodiments, the service provider network (and, in some cases, a MapReduce cluster implemented within the service provider network) may be distributed across multiple such availability zones (not shown). In this example, MapReduce cluster 120 includes multiple groups of vitalized resource instances, including instance group 121A (which contains at least instances 125A and 125C), instance group 121B (which contains at least instances 125D and 125F), and instance group 121C (which contains at least instances 125G and 125I). MapReduce cluster 120 also include one or more monitoring components 124 and auto-scaling policy information 126. In this example, resource pools 130 include reserved instance pool 131A (which includes at least instances 135A and 135B), on-demand instance pool 131B (which includes at least instances 135D and 135E), and spot instance pool 131C (which includes at least instances 135G and 135H). In some embodiments, when increasing the capacity of one of the instance groups within a MapReduce cluster (such as MapReduce cluster 120), one or more available instances from various resource pools (such as resource pools 130) may be added to the instance group. Conversely, when decreasing the capacity of one of the instance groups within a MapReduce cluster (such as MapReduce cluster 120), one or more instances within the MapReduce cluster may be returned to various resource pools (such as resource pools 130), according to applicable resource management policies and/or service agreements.

As illustrated in FIG. 1 and described in more detail herein, in some embodiments, provider network 100 may include a monitoring service and metrics aggregator 160 (which may collect or receive metrics information from monitoring components 124 and then aggregate at least some of those metrics), an auto-scaling rules engine 165 (which may evaluate expressions that are depending on the collected, received, and/or aggregated metrics and that represent auto-scaling trigger conditions), a resource manager 150, and a resource management database 170. In some embodiments, in response to determining that an auto-scaling trigger condition evaluates true, the auto-scaling rules engine 165 may send a notification to resource manager 150 indicating that an automatic scaling should be performed, in response to which resource manager 150 may initiate the addition or removal of resource capacity for the affected instance group(s).

In some embodiments, resource manager 150 may include a client interface through which one or more clients 110 may interact with provider network 100 to receive distributed computing services (which may include auto-scaling services). For example, in some embodiments, a client 110 may define (through client interface 155) an auto-scaling policy to be applied to one or more particular ones of the instance groups within MapReduce cluster 120. Each policy may define an expression (e.g., an auto-scaling trigger condition) to be evaluated when executing a distributed application on MapReduce cluster 120, may specify a scaling action to take when the expression evaluates true (e.g., add or remove capacity), may specify an amount or percentage by which to increase or decrease capacity, and/or may identify the cluster (and/or instance group(s) thereof), to which the policy applies. In some embodiments, information representing the user-defined policies (and/or any default auto-scaling policies supported by the service) and associations between the policies and MapReduce cluster 120 (or specific instance groups thereof) may be stored in resource management database 170.

In some embodiments, resource management database 170 may also store other types of resource management information. For example, resource management database 170 may store resource usage data, which may include the past task execution history for a client 110, resource utilization history, billing history, and overall resource usage trends for a given set of resource instances that may be usable for the client's tasks. In some cases, the resource manager 150 may use past resource usage data and trends for a given set of resource instances to develop projections of future resource usage and may use these projections in developing execution plans or in determining how and/or when to perform various auto-scaling actions (e.g., actions that have been triggered by auto-scaling rules engine 165 based on auto-scaling policies selected and/or defined by, or on behalf of, client 110).

Figure 2:
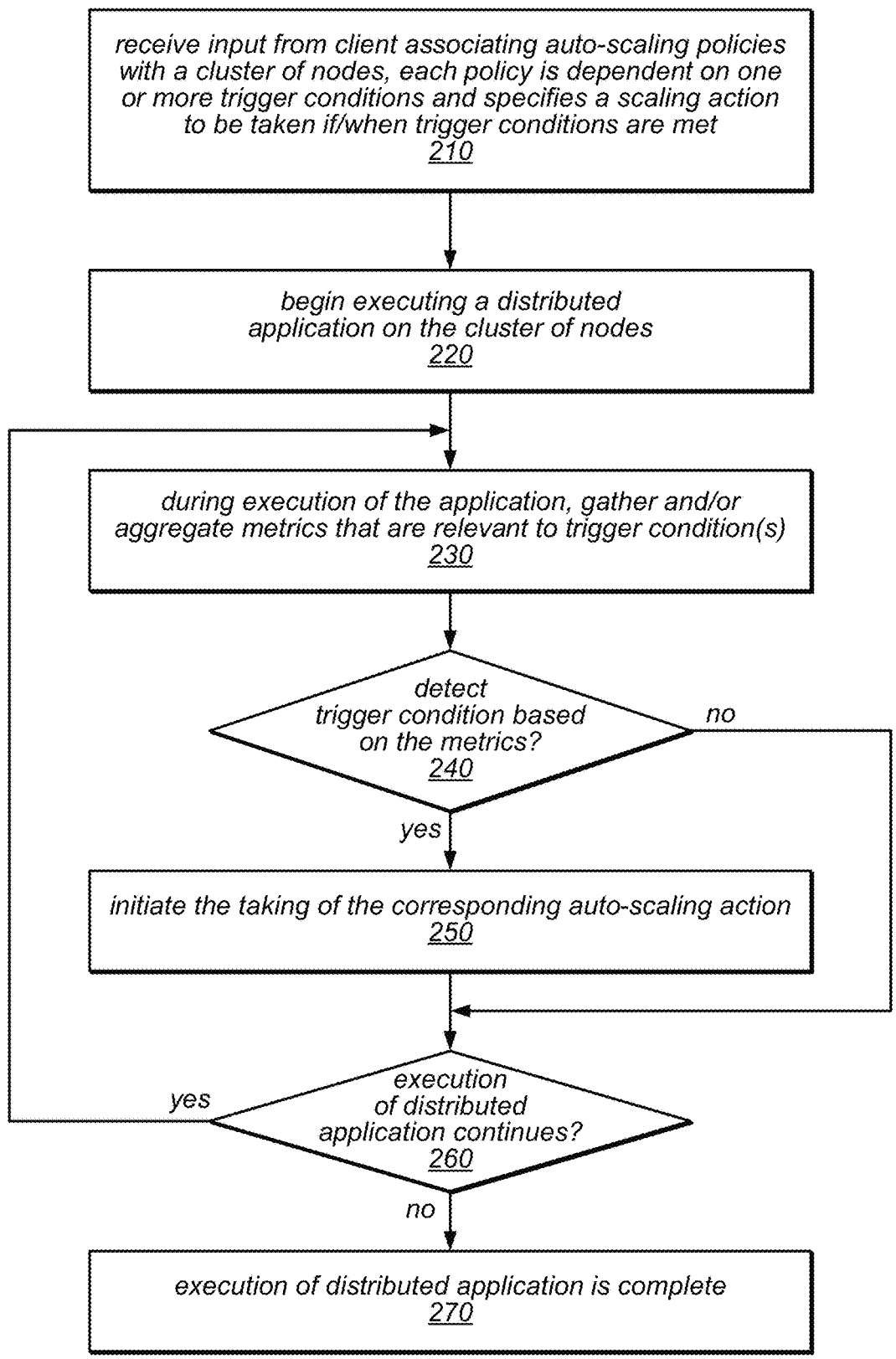
FIG. 2 is a flow diagram illustrating one embodiment of a method for performing automatic scaling of a cluster of nodes.

One embodiment of a method for performing automatic scaling of a cluster of nodes is illustrated by the flow diagram in FIG. 2. As illustrated at 210, in this example, the method may include a service provider or service receiving input from a client associating one or more auto-scaling policies with a cluster of nodes. As illustrated in this example, each of the policies may be dependent on one or more trigger conditions and may specify a particular auto-scaling action to be taken if/when trigger conditions are met (e.g., increasing or decreasing the number of nodes in the cluster or within an instance group within the cluster). Note that, as described in more detail herein, the cluster of nodes may include two of more types of nodes in respective instance groups, and that different auto-scaling policies may be applied to the nodes in different instance groups. In various embodiments, at least some of the auto-scaling policies may be application-specific and/or may be particularly well suited for application to a specific type of workload.

As illustrated in this example, the method may also include beginning execution of a distributed application on the cluster of nodes, as in 220. As illustrated in FIG. 2, the method may include, during execution of the application, gathering and/or aggregating metrics that are relevant to trigger condition(s), as in 230. Examples of such metrics (some of which may be application-specific, workload-specific, and/or specific to a particular instance group) are described herein.

As illustrated in this example, until or unless an auto-scaling trigger condition is detected based on the obtained and/or aggregated metrics (or execution of the distributed application is complete), the method may include continuing execution of the distributed application on the cluster of nodes without any changes to the number of nodes in the cluster. This is illustrated in FIG. 2 by the negative exit from 240, and the feedback from the positive exit from 260 to 230. However, if and when an auto-scaling trigger condition is detected based on the obtained and/or aggregated metrics, shown as the positive exit from 240, the method may include initiating the taking of the corresponding auto-scaling action, as in 250. For example, the number of nodes in the cluster (or within an instance group thereof) may be increased or decreased in response to a corresponding auto-scaling trigger condition being met, in different embodiments.

As illustrated in this example, the method may include repeating any or all of the operations shown in elements 230-250, as appropriate, until execution of the distributed application is complete (shown as the negative exit of 260, and element 270).

In general, in the distributed computing systems described herein, one or more compute nodes may access portions of a data set from data storage, process the data, and output the processed data to data storage (which may be, but is not necessarily, the same data storage from which the data set was accessed). The distributed computing system may be implemented according to a distributed computing framework. As a non-limiting example of a framework for implementing such distributed computing systems, the Apache™ Hadoop® open source software library provides a framework that allows for the distributed processing of large data sets across clusters of compute nodes using simple programming models. This library provides an implementation of a distributed processing architecture called MapReduce, which includes a programming model for processing large data sets with a parallel, distributed algorithm on a cluster.

In various embodiments, a MapReduce program may include a Map( ) procedure (sometimes referred to herein as a "mapper process" or a "mapper") that performs filtering and sorting and a Reduce( ) procedure (sometimes referred to herein as a "reducer process" or a "reducer") that performs a summary operation. For example, under this approach, a parallel application (or a parallel computation or task of an application) may be mapped to a set of computing nodes (e.g., hosts or servers) for processing. The results of the computation performed by those computing nodes may then be reduced down to a single output data set. One node, designated as the master node, may control the distribution of tasks by the other computing nodes (e.g., slave nodes that may also be referred to as "worker nodes"). In some embodiments, a service provider may provision a collection of virtualized resource instances as computing nodes in a MapReduce cluster, and the computing nodes of the MapReduce cluster may obtain data from and/or write data to virtualized storage resources via an object storage service. Note that a MapReduce cluster may be created with an arbitrary number of computing nodes, and not all of the computing nodes of a MapReduce cluster need to be assigned (or configured) as mappers or reducers. Also note that there may not (necessarily) be a one-to-one mapping between mapper processes (or reducer processes) and computing nodes. For example, multiple mapper processes may be run on a single computing node.

MapReduce is a parallel programming technique that may be employed to perform high-performance computing (HPC) applications or large and/or complex computations thereof (e.g., computational fluid dynamics simulations for aerospace or mechanical engineering, or molecular fluid dynamics simulations) in distributed computing environments. In some embodiments, the systems described herein may provide a framework in which programs may be executed on MapReduce clusters on behalf of clients (e.g., client applications, end users, service subscribers, or third party services that are customers of the service).

Figure 3:
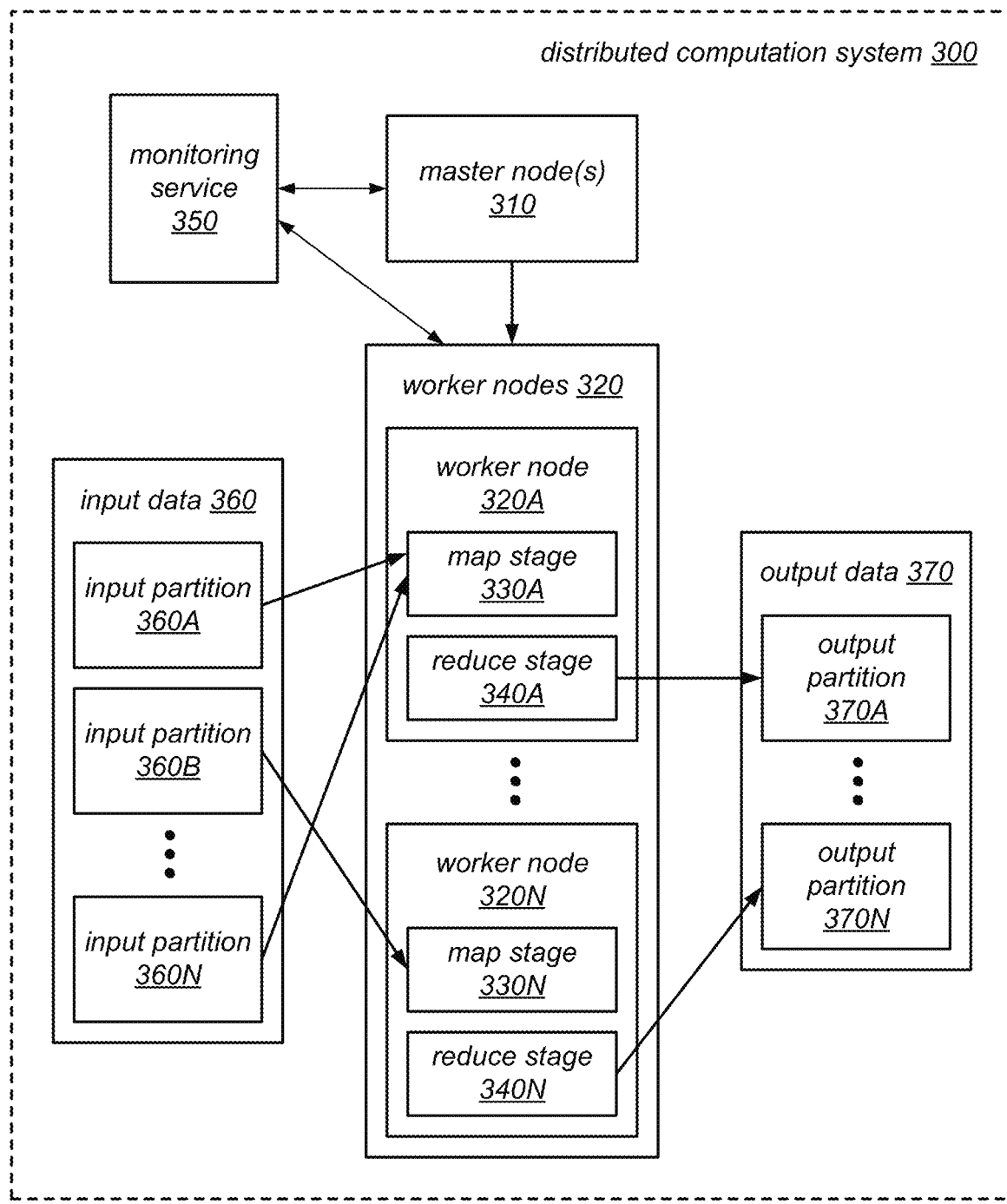
FIG. 3 illustrates an example system environment for performing a MapReduce job, according to one embodiment.

Various embodiments of methods and systems for implementing automatic scaling of clusters in distributed systems (e.g., MapReduce clusters) are described herein. FIG. 3 illustrates an example system environment in which the auto-scaling techniques described herein may be implemented, according to various embodiments. The example system environment may implement a distributed computation system 300. The distributed computation system 300 may include one or more master nodes 310 and a plurality of worker nodes 320 such as worker nodes 320A-320N. The master node(s) 310 may represent one or more coordinator processes that coordinate computations performed by the worker nodes 320. The worker nodes may also be referred to herein as "worker hosts," "workers," or "hosts."

The distributed computation system 300 may use one or more networks or interconnections to couple the various components. Elements of the distributed computation system 300 may be located in any suitable location relative to one another, from being virtual compute instances hosted on the same computing hardware to being different physical compute instances hosted in the same data center to being geographically remote. In some embodiments, the master node(s) 310 and worker nodes 320 may implement a MapReduce architecture in which the worker nodes perform similar tasks concurrently under the direction of the master node(s). However, it is contemplated that the distributed computation system 300 may implement other types of distributed computation architectures instead of or in addition to MapReduce.

Using the distributed computation system 300, a set of input data 360 may be processed by the worker nodes 320 to produce a set of output data 370. The input data 360 may be split into a plurality of partitions, such as input partitions 360A and 360B through 360N. One or more of the partitions of the input data 360 may be assigned to each of the worker nodes 320. The input data 360 may be split into partitions on any suitable basis. For example, partition boundaries may be based on the boundaries between individual records, individual lines of data, etc. An individual partition may include elements of input data, such as related items or families of items that are intended to be processed together by a single worker node. Although three partitions 360A, 360B, and 360N are illustrated for purposes of example, it is contemplated that any suitable number of partitions of input data may be processed using the distributed computation system 300. The assignment of individual partitions to individual worker nodes as shown in FIG. 3 is presented for purposes of example and illustration; it is contemplated that any suitable assignment of individual partitions to individual worker nodes may be used with the distributed computation system 300.

In some embodiments, the master node(s) 310 may provide individual partition(s) of the input data 360 to individual worker nodes, e.g., by performing aspects of the partitioning of the input data and/or aspects of the assignment of individual partitions to individual worker nodes. In one embodiment, the master node(s) 310 may send data indicative of partition assignments to individual worker nodes, and each worker node may acquire its one or more partitions of input data using any suitable technique. For example, a worker node may read a portion of the input data from one or more files or storage locations in one or more storage devices that are accessible to the worker nodes, e.g., over a network. Alternatively, the master node(s) 310 may directly send the relevant partition(s) to individual worker nodes using a network. In various embodiments, the partition(s) of input data to be processed using a particular worker node may be loaded into memory at the particular worker node either partially or entirely before the processing of the partition(s) is initiated.

Each of the worker nodes 320 may perform any suitable processing tasks to generate one or more partitions of the output data 370 based on one or more partitions of the input data 360. In one embodiment, the processing tasks implemented using the worker nodes 320 may be provided by the master node(s) 310, e.g., by sending program code to the worker nodes or instructing the worker nodes to load the program code from one or more storage locations. At least a portion of the processing tasks performed by the worker nodes 320 may be performed concurrently, i.e., in parallel relative to each other. In some embodiments, each of the worker nodes 320 may perform similar tasks and/or implement similar algorithms to process its partition(s) of the input data. As a result of the processing of the input data 360, each of the worker nodes 320 may produce one or more partitions of output data 370. Although two output partitions 370A and 370N are illustrated for purposes of example, it is contemplated that any suitable number of output partitions may be generated using the distributed computation system 300. As they are produced by the worker nodes 320, the output partitions 370A-370N may be stored in one or more storage locations on one or more storage devices that are accessible to the worker nodes. The output partitions 370A-370N may also be referred to as final output data. In one embodiment, the output partitions 370A-370N may be further processed by the master node(s), e.g., by aggregating or concatenating the individual partitions into a single output file.

The computation performed by each of the worker nodes 320 may include multiple stages of computation, such as a first stage and a second stage. The first stage may be a map stage (in which a mapper process is performed), such as map stage 330A performed by worker node 320A and map stage 330N performed by worker node 320N. The second stage may be a reduce stage (in which a reducer process is performed), such as reduce stage 340A performed by worker node 320A and reduce stage 340N performed by worker node 320N. In one embodiment, the map stage may include any computation(s) to generate intermediate output based on the input data 360. In one embodiment, the intermediate output may be partitioned but not necessarily sorted. As used herein, the term "partitioned" indicates that related elements of data are grouped together into partitions. Typically, the elements of data in a particular partition are intended to be processed using the same host. In one embodiment, the reduce stage may include any computation(s) to generate final output 370 based on the intermediate output. For example, the reduce stage may aggregate elements of the data produced by the map stage.

As illustrated in FIG. 3, in some embodiments, distributed computation system 300 may include a monitoring service that is employed in implementing auto-scaling for the cluster of nodes (e.g., for a MapReduce cluster). For example, in various embodiments, each of the master nodes 310 and/or worker nodes 320 may include a monitoring component or may interact with a separate monitoring component in the same system (such as monitoring component 350). In other embodiments, the monitoring component may be implemented in a different system on the service provider network (e.g., in a service that gathers and/or analyzes relevant metrics characterizing the behavior of the compute nodes and/or storage nodes of distributed computation system 300) and may be configured to determine if and when to add or subtract capacity. In some embodiments, monitoring component 350 may gather and analyze such metrics or may gather the metrics and pass them to a separate auto-scaling rules engine for analysis, after which the auto-scaling rules engine may determine whether and when there is a need to perform auto-scaling actions (not shown). In some embodiments, an auto-scaling rules engine may be implemented in a control plane of distributed computation system 300, or in a control plane of another service (e.g., a storage service and/or a hardware virtualization service in the system). In still other embodiments, an auto-scaling rules engine may be implemented within a separate auto-scaling service by the service provider, and the storage services and/or hardware virtualization services described herein may be a client of the auto-scaling service.

It is contemplated that the distributed computation system 300 may include additional components not shown, fewer components than shown, or different combinations, configurations, or quantities of the components shown. Although two worker nodes 320A and 320N are illustrated for purposes of example, it is contemplated that any suitable number of worker nodes may be used in conjunction with the distributed computation system 300.

Although one master node 310 is illustrated for purposes of example, it is contemplated that any suitable number of master nodes 310 may be used in conjunction with the distributed computation system 300. In various embodiments, any of the worker nodes 320 and/or master node(s) 310 may be implemented as virtual compute instances or as physical compute instances. The distributed computation system 300 may include one or more computing devices, any of which may be implemented by a computing device similar to the example computer system illustrated in FIG. 17. In various embodiments, the functionality of the different components of the distributed computation system 300 may be provided by the same computing device or by different computing devices. If any of the various components are implemented using different computing devices, then the respective computing devices may be communicatively coupled, e.g., via one or more networks. Each component of the distributed computation system 300 may represent any combination of software and hardware usable to perform their respective functions, as discussed as follows.

In some embodiments, the distributed computation system 300 may manage the allocation of network-accessible resources. Networks set up by an entity such as a company or a public sector organization to provide one or more services (such as various types of cloud-based computing or storage) accessible via the Internet and/or other networks to a distributed set of clients may be termed provider networks. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

In some embodiments, operators of provider networks may implement a flexible set of resource reservation, control, and access interfaces for their clients. For example, a provider network may implement a programmatic resource reservation interface (e.g., via a web site or a set of web pages) that allows clients to learn about, select, purchase access to, and/or reserve resource instances. In one embodiment, resources may be reserved on behalf of clients using a client-accessible service that implements the distributed computation system 300. According to one such embodiment, the distributed computation system 300 in such an environment may receive a specification of one or more tasks to be performed for a client, along with a set of input data or an indication of a source of input data to be used by the task(s). In response, the distributed computation system 300 may determine an execution plan for implementing the task(s) using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client. The distributed computation system 300 may schedule an execution of the task(s) using the selected resources.

In some embodiments, the client may use one or more suitable interfaces (such as one or more web pages, an application programming interface (API), or a command-line interface) to specify the task(s) to be implemented, the input data set, the computing resources to be used, and/or a time at which the task(s) should be initiated. In one embodiment, the client may be able to view the current execution status of the task(s) using the interface(s). In one embodiment, additional information about executed tasks may be available via the interface(s), such as program output, error logs, exception logs, and so on.

Figure 4:
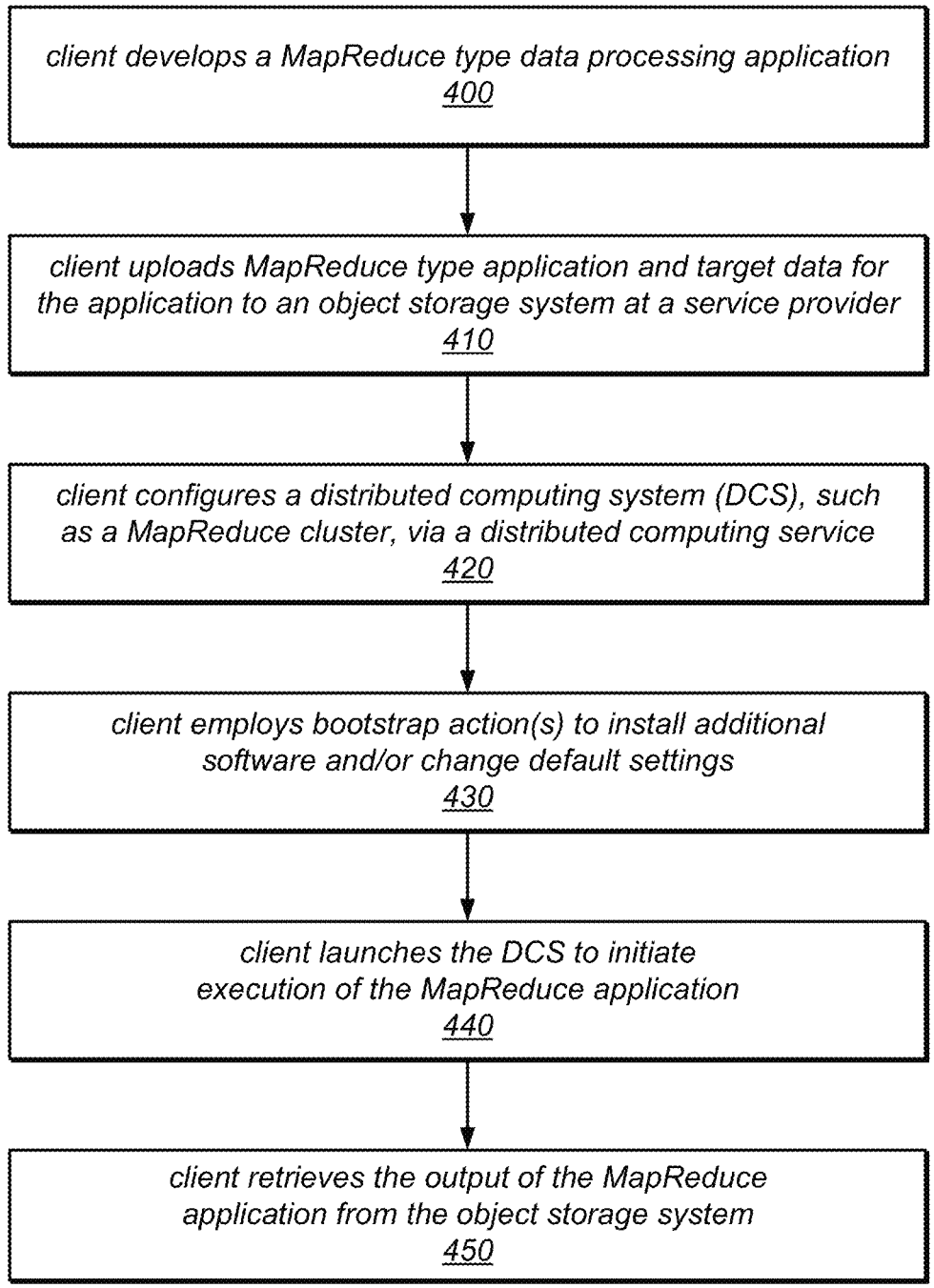
FIG. 4 is a flow diagram illustrating one embodiment of a method for performing a MapReduce type data processing application in a distributed computing system.

One embodiment of a method for performing a MapReduce type data processing application in a distributed computing system (on a MapReduce cluster) is illustrated by the flow diagram in FIG. 4. Note that, in some embodiments, the auto-scaling techniques described herein may be applied during execution of the MapReduce type data processing application (not shown). As illustrated at 400, in this example, the method may include a client developing a MapReduce type data processing application. Note that, in different embodiments, such an application may be developed using any of a variety of programming languages. The method may include the client uploading the MapReduce type application and target data for the application to an object storage system at a service provider, as in 410. For example, the data may be uploaded to one or more physical storage devices of the service provider using an import feature or other input interface of the service, by establishing a dedicated network connection to the service provider, or by writing the data directly to a cluster that is already running, in different embodiments.

As illustrated in this example, the method may include the client configuring (or requesting the configuration of) a distributed computing system (DCS), such as a MapReduce cluster, via a distributed computing service, as in 420. For example, the client may configure (or request the configuration of) a cluster of computing nodes (hosts) to collectively execute MapReduce type applications on behalf of service clients, where each node (host) includes one or more CPU cores. In some embodiments, the client may be able to specify various parameters of the cluster and/or the job to be executed on the cluster (e.g., the number of virtualized resource instances to provision in the cluster, the types of instances to use, the applications to install, and/or the locations of the application and its target data) through a GUI, command line interface, script, API, or another interface mechanism.

As illustrated at 430 in FIG. 4, the method may include the client employing one or more bootstrap actions to install additional software and/or to change one or more default configuration settings of the DCS (e.g., the MapReduce cluster). Bootstrap actions are scripts that are run on each of the cluster nodes when the cluster is launched (e.g., before the MapReduce application starts and before the node begins processing data). In various embodiments, the client may invoke custom bootstrap actions, or may invoke predefined bootstrap actions provided by the service provider. The method may also include the client launching the DCS (e.g., the MapReduce cluster) to initiate the execution of the MapReduce application, as in 440, and (as the application executes or once it has finished executing), the client retrieving the output of the MapReduce application from the object storage system, as in 450.

Note that, in some embodiments, the service provide may automatically terminate the DCS (e.g., the MapReduce cluster) when processing of the MapReduce application is complete (not shown). In other embodiments, the DCS (e.g., the MapReduce cluster) may be kept running after processing of the MapReduce application is complete, and the client may be able to submit more work to the DCS/cluster. Note also that, in some embodiments, the client may be able to monitor the health of the DCS (e.g., the MapReduce cluster) and/or the progress of the MapReduce application various monitoring tools or utilities that are exposed by the service provider using (e.g., through a GUI, command line interface, script, API, or another interface mechanism). In some embodiments, the client may be able to add capacity to or remove capacity from the DCS/cluster at any time in order to handle more or less data. The service provider may also expose one or more debugging utilities (e.g., through a GUI, command line interface, script, API, or another interface mechanism), in some embodiments.

Figure 5:
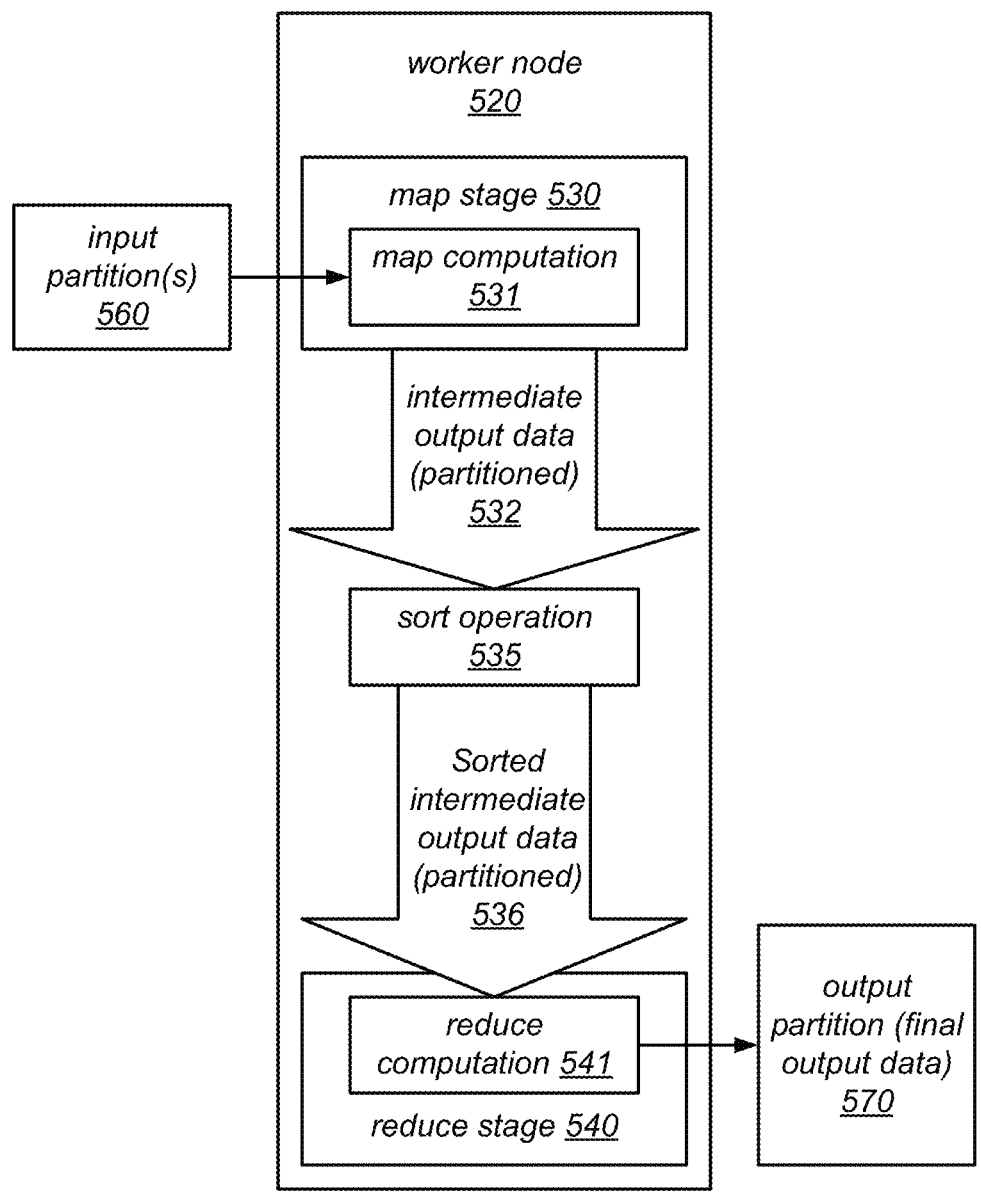
FIG. 5 illustrates a worker node configured for performing a MapReduce job, according to one embodiment.

One embodiment of a worker node that is configured for performing MapReduce jobs is illustrated by the block diagram in FIG. 5. Again note that, in some embodiments, the auto-scaling techniques described herein may be applied during execution of the MapReduce type data processing application by multiple worker nodes (not shown). As illustrated in this example, a worker node (such as worker node 520) may use one or more input partition(s) 560 as input and produce an output partition (i.e., final output data) 570. The worker node 520 may be implemented in the same manner as discussed above with respect to worker nodes 320A-320N illustrated in FIG. 3. The processing of the input partition(s) 560 may include a map stage 530 and a reduce stage 540 performed using the worker node 520.

As illustrated in this example, the map stage 530 may include a map computation 531. The map computation 531 may include the execution of program instructions using elements of the input partition(s) 560 as input. The program code used in the map computation 531 may be specified by a master node (such as one of the master nodes 110 illustrated in FIG. 1). The map computation 531 may generate intermediate output data 532. The intermediate output data 532 may be partitioned such that related elements of data are grouped together on the same worker node 520. The partitioning of the intermediate output data 532 may indicate that the intermediate output data 532 contains related elements of data (e.g., data for items and/or families of items). The partitioning of the intermediate output data 532 may indicate that the elements of data in the intermediate output data 532 may be processed together in the reduce stage 540, i.e., processed in the reduce stage using a single worker node and without re-partitioning and distribution to multiple worker nodes.

In some embodiments, a sort operation 535 may be performed between the map stage 530 and the reduce stage 540. The sort operation 535 may sort elements of data in the intermediate output data 532 to produce sorted intermediate output data 536. The intermediate output data 532 may be sorted based on any suitable key(s) or field(s) of data, such as the key(s) or field(s) of data required by the reduce stage 540.

As illustrated in this example, the reduce stage 540 may include a reduce computation 541. The reduce computation 541 may include the execution of program instructions using elements of the intermediate output data 532 or sorted intermediate output data 536 as input. The program code used in the reduce computation 541 may be specified by a master node (such as one of the master nodes 310 illustrated in FIG. 3). The reduce computation 541 may generate final output data 570. In some embodiments, the reduce computation 541 may perform an aggregation of the intermediate output data 532 or sorted intermediate output data 536. Note that in other embodiments, a sort operation may be performed by the worker node 520 as part of the reduce stage 540. In some embodiments, the map stage 530 and reduce stage 540 may be performed using computations executed on the same worker node 520, and intermediate data 532 or 536 may not be provided to another worker node.

As described in more detail herein, a service customer or subscriber may be able to define an auto-scaling policy that is dependent on expressions based on a variety of trigger types (metrics) from a variety of trigger sources. For example, some metrics used in the expression that will be evaluated (e.g., by an auto-scaling rules engine) as part of an auto-scaling policy may be collected by a separate monitoring service on the service provider network (e.g., one that collects internally accessed metrics that are emitted from the cluster, a resource instance, or an application). Other trigger sources may include a custom application (e.g., a customer application that has been instrumented to emit one or more custom metrics) or another service within the service provider network. As described herein, the trigger data may include performance or behavior metrics, storage metrics (e.g., consumption of storage, remaining capacity), cron-like expressions (e.g., time information, clock/calendar types of triggering information), metrics indicating the state or number of pending or currently executing jobs, pricing information, cost information, or other metrics that may or may not be specific to MapReduce clusters.

In some embodiments, a default set of metrics may be made available by default and customers may (or may not) add to the set of metrics available for use in making auto-scaling decisions by defining one or more other metrics. In some embodiments, the service provider may add to the set of default metrics in response to determining the types of metrics that customers appear to be interested in and/or in response to determining that other metrics correlate well with certain types of auto-scaling decisions. For example, it may be determined that some combinations of default and/or custom metrics may make better triggers for making auto-scaling decisions than those default or custom metrics alone. In some embodiments, the systems described herein may provide a framework to allow customer applications to be able to define and report their own metrics, and to define and apply their own policies for auto-scaling. Some example metrics that may be defined (or selected) by a customer for use in making auto-scaling decisions may include overall memory available in a cluster (e.g., if running a high memory intensive application), or local HDFS disk capacity (e.g., in clusters that are running for a long time and tend to fail due to filling up their disks). In general, customers may define, or select for use in making auto-scaling decisions, metrics that give insight into the utilization and/or behavior of resources that are heavily used by their applications and/or workloads. In some embodiments, customers may (within their applications) be able to set their own counters (e.g., to reflect application-specific metrics), and may be able to use the values of those counters in making auto-scaling decisions.

In some embodiments, the systems described herein may employ an existing monitoring service in creating and enforcing cluster auto-scaling policies. For example, a distributed computing system (e.g., one that implements a Hadoop framework or MapReduce cluster) may be integrated with such an existing system in order to leverage its existing processes for collecting metrics information and/or its client interface (which may be modified for use in defining auto-scaling rules and/or policies, as described herein). In some such embodiments, the clusters created in the distributed computing environment may emit metrics to the exiting monitoring service by default, and the service provider may control what metrics are emitted to the monitoring system. For example, in one embodiment, a distributed computing system that implements a MapReduce cluster may provide (by default) twenty-three cluster-level metrics to an existing monitoring service and another 30-40 application-specific metrics for each of several commonly used applications or engines. In one example, in order to handle auto-scaling in a system that implements a Presto SQL application, one or more metrics may be emitted to the monitoring system that are related to memory utilization. Customers may be able to define policies that use any and all metrics collected by the monitoring system and/or custom metrics or those obtained from other trigger sources, in various embodiments. In general, the systems and techniques described herein may give users the ability to customize auto-scaling for their clusters and may facilitate cluster auto-scaling for many different applications.

As described herein, a MapReduce cluster may in various embodiments, be configured to automatically scale up or down when triggered by one or more of the following:

a metric captured by a monitoring service crossing a specified threshold for a specified time period—For example, an auto-scaling action (e.g., an action to reduce capacity) may be triggered if the number of mappers in the cluster is less than 2 for at least 60 minutes.

a cluster metric (e.g., one that is published by the cluster but is not available in the monitoring service) crossing a specified threshold for a specified time period.—For example, an auto-scaling action (e.g., an action to add capacity) may be triggered if the storage-to-virtualized-computing-service throughput is greater than or equal to 100 for at least 120 minutes.

an estimated time to complete all in-progress and pending jobs on the cluster.—For example, an auto-scaling action (e.g., an action to add capacity) may be triggered if the estimated complete time for all jobs is greater than or equal to 120 minutes.

the day (or date) and/or time—For example, an auto-scaling action (e.g., an action to add or reduce capacity) may be triggered every Saturday at 17:00.

As described herein, automatic cluster scaling may be governed by one or more auto-scaling policies. In some embodiments, in order to take advantage of the auto-scaling techniques described herein, a customer may rely on default auto-scaling policies (such as any of those described herein), or may write their own auto-scaling policies and upload them to the service provider network (e.g., to a storage service thereof). in some embodiments, an auto-scaling policy may contain one or more rules, and each rule may contain some or all of the following elements:

one or more expressions to evaluate—Customers may define one expression that represents an auto-scaling trigger condition or may combine two or more expressions to create an auto-scaling trigger condition using the logical operators AND or OR. For example, the following may be valid expressions defined in an auto-scaling policy:
"numberOfMappers<2 for at least 60 minutes"
OR("numberOfMappers<2 for at least 60 minutes", "numberOfMappers<5 for at least 120 minutes")

the action to take if the expression is True—For example, the action may be one of the following:
"add" (i.e., add capacity to the cluster or to specific instance groups thereof)
"remove" (i.e., remove capacity from the cluster or from specific instance groups thereof)
"terminate-cluster" (i.e., terminate the entire cluster)—Note that if the action is to terminate the cluster, it may not be necessary to specify any of the remaining parameters listed below.

the amount or percentage of capacity (e.g., the number or percentage of resource instances) to add to or remove from the cluster (or specific instance groups thereof)—For example the policy may specify the change in resource capacity as one of the following:
"5" (e.g., 5 resource instances should be added or removed)
"20%" (e.g., the change should represent 20% of the current resource instances)

the instance group(s) where the action should be performed—In various embodiments, the policy may indicate that the action should be taken with respect to only one specified instance group, in multiple specified instance groups, or in all instance groups of a particular type (e.g., all Core instance groups, or all Task instance groups). For example, the policy may specify the instance groups as one of the following:
"abc-123" (i.e., an identifier of one instance group)
"abc-123", "xyz-978" (i.e., identifiers of two instance groups)
"core" (e.g., indicating all instance groups containing storage nodes)
"task" (e.g., indicating all instance groups containing compute nodes)

In some embodiments, at least some of the default policies provider by the distributed computing system may be specific to a given use case. For example, there may be one default auto-scaling policy (or default set of auto-scaling policies) for extraction, transformation and loading (ETL), and another default auto-scaling policy (or default set of auto-scaling policies) that is more applicable for low-latency querying, since the metrics and rules might vary significantly from one use case to another.

In some embodiments, in addition to the elements described above, some (if not all) auto-scaling policies may include a set of cluster-level limits. These cluster-level limits may include any or all of the following, in various embodiments, as well as other cluster-level limits:

an optional minimum instance count for the cluster that constrains how many instances can be removed by an auto-scaling operation. For example, in order to constrain the operation so that no fewer than five instances remain in the affected cluster or instance group thereof following an auto-scaling operation to remove capacity, the policy may set this limit to a value of "5".

an optional maximum instance count that constrains how many instances can be added by an auto-scaling operation. For example, in order to constrain the operation so that no more than twenty-five instances are included in the affected cluster or instance group following an auto-scaling operation to add capacity, the policy may set this limit to a value of "25".

the time to wait (e.g., in minutes) until the next possible auto scaling event. For example, in order to prevent another auto-scaling operation to be applied to a cluster or instance group thereof until at least thirty minutes after completion of an auto-scaling operation is applied to the cluster or instance group, the policy may set this limit to a value of "30".

In some embodiments, a customer may have the ability to write their own policy by creating an auto-scaling policy document (e.g., a document written using JavaScript Object Notation, i.e., a JSON document) using a document structure and syntax for writing the expressions that are predefined by the service provider. In some embodiments, the customer may upload the resulting auto-scaling policy document to a storage service on the service provider network and then provide the path to the document when enabling auto-scaling. In other embodiments, the auto-scaling policy document may be stored in the control plane of the distributed computing system or cluster, and may be accessed by an auto-scaling rules engine when making auto-scaling decisions.

As described in more detail herein, in some embodiments, a user (e.g., a service customer or subscriber) may combine auto-scaling polices (e.g., the user may include multiple auto-scaling rules within a single policy or may associate multiple auto-scaling policies (each defining one or more auto-scaling rules) with the same cluster or instance group thereof. In some embodiments, it may not be possible to validate conflicts between auto-scaling rules or between auto-scaling policies in a programmatic manner (since, for example, a customer can define custom application-specific metrics and use those within expressions in a custom auto-scaling policy). Therefore, in some embodiments, any potential conflicts may be resolved using a conflict resolution mechanism based on ordering, as follows: the priority of each rule or policy may be given by the position of the rule or policy in a list of rules per policy or policies per instance group. In some embodiments, all policies may be evaluated, but only the first policy (or rule within a policy) that triggers an auto-scaling action results in that action being taken. If another rule or policy triggers a conflicting action, that action is not taken. In some embodiments, the customer may be able to explicitly associate a priority ranking or an evaluation order with each auto-scaling policy or rule thereof.

In some embodiments in which an existing monitoring service is employed in creating auto-scaling policies, the monitoring service may provide a public-facing API through which customer can define and push their custom metrics directly to the monitoring service. In other embodiments, the creation of custom metrics may be decoupled from the existing monitoring service. However, in some such embodiments, the system may need to ensure that there is a unique identifier or name for each metric, whether it is collected by the monitoring service or is obtained through another trigger source. In some embodiments, the customer may then use those unique identifiers or names in their custom policies, regardless of the trigger source.

In one example embodiment in which an existing monitoring service is employed in creating auto-scaling policies, an API of the monitoring service may be used when writing an expression representing an auto-scaling trigger condition that is dependent on one or more of the metrics monitored and/or collected by the monitoring service. For example, in one such embodiment, a properly formed expression using a metric collected by the monitoring service may include has four space-separated elements, contained in quotes, as follows:

Syntax: "[metric name] [>, >=, <, <=, ==] [threshold] [time period in minutes]"

Some example expressions created using this syntax are shown below. In the first expression, the metric "MappersRemaining" is compare to a threshold value of 2, and the expression evaluates as True is the value of this metric is less than 2 for at least 60 minutes. In the second expression, the metric "MasterCPU" is compared to a threshold value of 0.01, and the expression evaluates as True if the value of this metric is less than 0.01 for at least 60 minutes.

"MappersRemaining<2 60"
"MasterCPU<0.01 60"

In some embodiments in which an existing monitoring service is employed in creating auto-scaling policies, a properly formed expression using estimated time to complete all in-progress and pending jobs may include three space-separated elements, contained in quotes, as follows:

Syntax: "[estimatedTime] [>, >=, <, <=, ==] [time period in minutes]"

An example expression created using this syntax is "estimatedTime>=120". This expression evaluate as True if the estimated completion time for all jobs is greater than or equal to 120 minutes.

In some embodiments in which an existing monitoring service is employed in creating auto-scaling policies, a properly formed expression using the date/time may use a date/time expression that calls the software utility "cron" contained in quotes, as follows:

Syntax: "[cron date/time expression]"

An example expression created using this syntax is "0 0 0 ?*SAT*". This expression may represent an auto-scaling trigger condition that evaluates to True every Saturday at midnight. For example, this expression may be included in an auto-scaling policy specifying that an auto-scaling action (e.g., adding 20 nodes to the cluster) should be performed every Saturday night at midnight. In this example, a complementary auto-scaling policy may specify that the cluster should be reduced at 04:00 every Monday morning.

In some embodiments, an auto-scaling policy may include multiple auto-scaling rules. In such embodiments, the rules defined in the auto-scaling policy may be evaluated in order, and independently of each other. In some embodiments, the first rule that evaluates to True will trigger a corresponding auto-scaling action, and no other rules will be evaluated once a single one of the rules evaluates to True. Therefore, care should be taken when ordering multiple rules within a single auto-scaling policy. In one specific example, a single auto-scaling policy may include a first rule that causes a cluster (or instance group thereof) to be scaled up if HDFS utilization exceeds 90% for more than 2 hours and a second rule that causes the cluster (or instance group thereof) to be scaled down if the cluster is idle for more than one hour. When the rule evaluator (e.g., an auto-scaling rules engine) is called to evaluate the auto-scaling policy against the current set of metrics, if the first rule evaluates to True, the cluster may be scaled up and the second rule may not be evaluated at all.

In some embodiments, cluster auto-scaling may be optional, and may be enabled upon creation of the cluster, e.g., by including a switch in the command line interface and specifying an auto-scaling policy or by specifying that a default policy should be applied. For example, in one embodiment, cluster auto-scaling may be enabled using one of the following commands:

$ create-cluster—enable-auto-scale "default-policy"
$ create-cluster—enable-auto-scale "storage-system/path/to/my/policy"

Similarly, in some embodiments, cluster auto-scaling may be enabled for a running cluster (e.g., subsequent to its creation without cluster auto-scaling). For example, in one embodiment, cluster auto-scaling may be enabled on a running cluster using one of the following commands:

$ cluster-id j-12345678—enable-auto-scale "default-policy"
$ cluster-id j-98642—enable-auto-scale "storage-system/path/to/my/policy"

Note that in other embodiments in which an existing monitoring service is employed in creating auto-scaling policies (and in at least some embodiments that do not employ an existing monitoring service), cluster auto-scaling may be enabled upon creation of a cluster, or while a cluster is running, through a graphical user interface (GUI) of the distributed computing system (or any component thereof) or through user interface "wizard" that implements a policy/rule building application.

Figure 6:
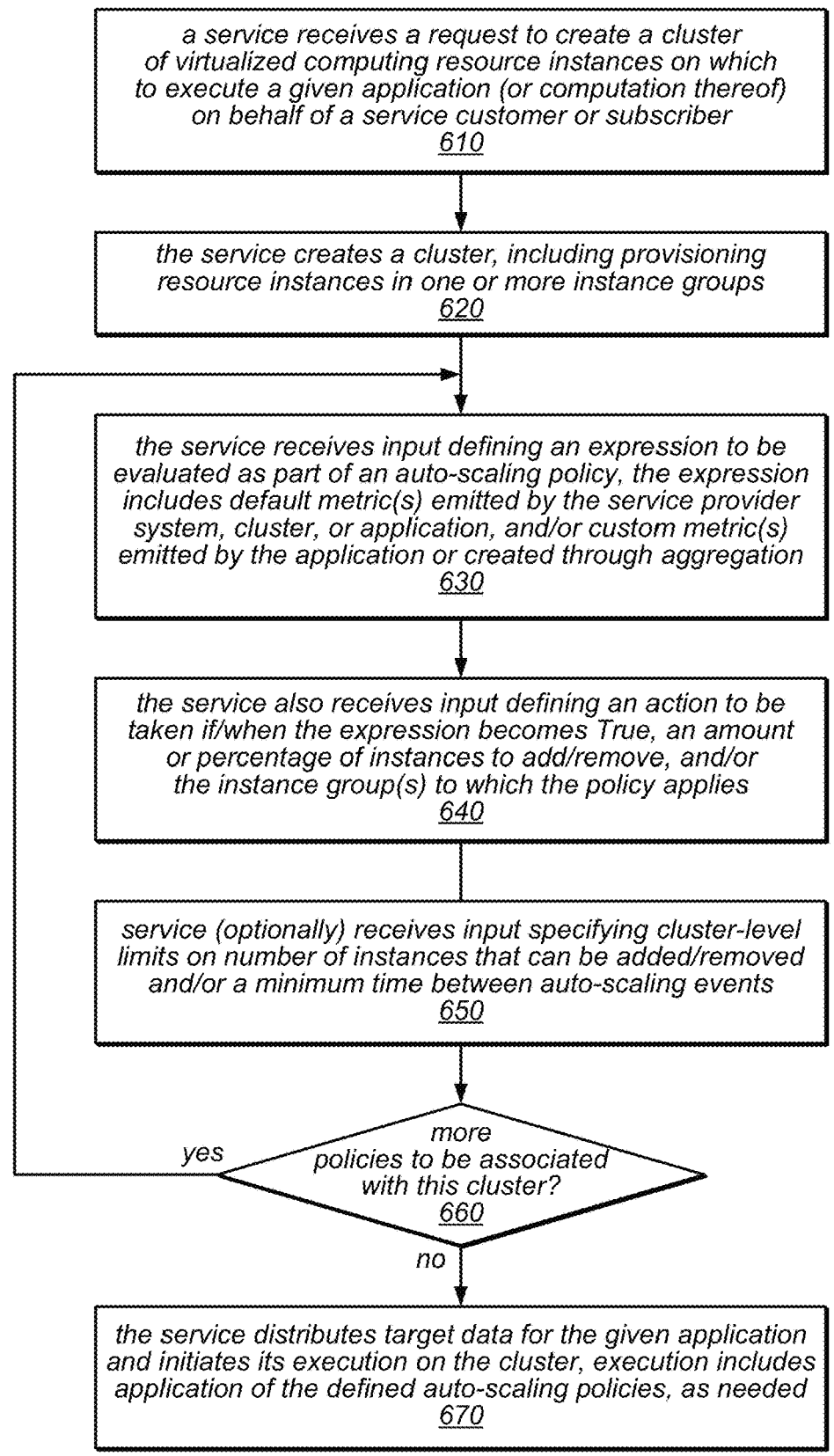
FIG. 6 is a flow diagram illustrating one embodiment of a method for defining an auto-scaling policy for a cluster of virtualized computing resource instances.

One embodiment of a method for defining an auto-scaling policy for a cluster of virtualized computing resource instances is illustrated by the flow diagram in FIG. 6. As illustrated at 610, in this example, the method may include a service receiving a request to create a cluster of virtualized computing resource instances on which to execute a given application (or a computation thereof) on behalf of a service customer or subscriber. The method may include the service creating a cluster, which may include including provisioning resource instances in one or more instance groups, as in 620. In some embodiments, the resource instances may be grouped according to type, e.g., one instance group may include multiple storage nodes, while another instance group may include compute nodes. In other embodiments, the resource instances may be grouped according to their role in executing the given application or computation (e.g., nodes involved in mapping stage be in a different instance group than those involved in a reduce stage).

As illustrated in FIG. 6, the method may include the service receiving input defining an expression to be evaluated as part of an auto-scaling policy, and the expression may include one or more default metrics that are emitted by the service provider system, by the cluster, or by the given application, and/or one or more custom metrics that are emitted by the application or that are created through aggregation of other ones of the default or custom metrics, as in 630. The method may also include the service receiving (e.g., for the auto-scaling policy) input defining an action to be taken if and when the expression becomes True (e.g., adding or removing capacity), an amount or percentage of resource instances to add or remove, and/or the instance group(s) to which the policy applies, as in 640. For example, at least some of the auto-scaling policies that apply to the resource instances in different instance groups may be different. As illustrated in this example, method may also include the service (optionally) receiving input specifying cluster-level limits on the number of instances that can be added/removed and/or a minimum time between consecutive auto-scaling events, as in 650.

As illustrated in this example, if there are more policies to be associated with this cluster, shown as the positive exit from 660, the method may include repeating the operations shown in 630-650, as appropriate, to create additional policies and associate them with the cluster. If (or once) there are no additional policies to be associated with this cluster, shown as the negative exit from 660, the method may include the service distributing target data for the given application and initiating its execution on the cluster, as in 670. As illustrated in this example, executing the given application may include applying the defined auto-scaling policies, as needed. Note that, in some embodiments, one or more of the auto-scaling policies that are associated with a cluster (or with one or more instance groups thereof) may be modified during execution of a given application (e.g., in response to input received from a client by the service). In some embodiments, one or more additional auto-scaling policies may be defined and/or associated with a cluster (or with one or more instance groups thereof) during execution of a given application, or an association between an auto-scaling policy and a cluster (or one or more instance groups thereof) may be revoked during execution of a given application. Such modifications, additions, and revocations are not shown in FIG. 6. Note also that, in some embodiments, an auto-scaling policy may specify that, in order to increase the capacity of a cluster, the service may be configured to add one or more instance groups to the cluster (rather than adding capacity to any existing instance groups within the cluster). Similarly, an auto-scaling policy may specify that, in order to decrease the capacity of a cluster, the service may be configured to remove one or more instance groups from the cluster (rather than removing capacity from any existing instance groups within the cluster).

In various embodiments, there may be different ways to support the cluster auto-scaling techniques described herein within the infrastructure of a service provider network. For example, FIG. 1 illustrates one embodiment of a service provider system that implements automatic scaling of a MapReduce cluster. In that example, the provider network includes monitoring components (e.g., metrics collectors or metrics collection agents) within the MapReduce cluster, a centralized monitoring service and metrics aggregator, a centralized auto-scaling rules engine that evaluates auto-scaling trigger conditions, and a centralized resource manager that carries out any auto-scaling actions resulting from those evaluations. In some embodiments, after a client (e.g., a service provider customer or subscriber) defines the metrics they are interested in and the auto-scaling policies that they wish to apply to various instance groups within a cluster, those definitions may be loaded into a resources management database (such as resource management database 170 in FIG. 1) or stored within the logical data model for the cluster (or one or more of its instance groups), e.g., as auto-scaling policy information 126. Subsequently, e.g., on a predetermined periodicity, the monitoring service may fetch the policy and the metrics on which it depends, and make them available to the auto-scaling rules engine, after which the rules engine may evaluate the auto-scaling trigger conditions defined by the policy, and initiate any actions that are called for by the policy. In some embodiments, the rules engine may be implemented within the control plane of the service provider system (or of a distributed computing service thereof), and this rules engine may look at the customer-defined policy and apply that to a current set of metrics to make auto-scaling decisions.

Figure 7:
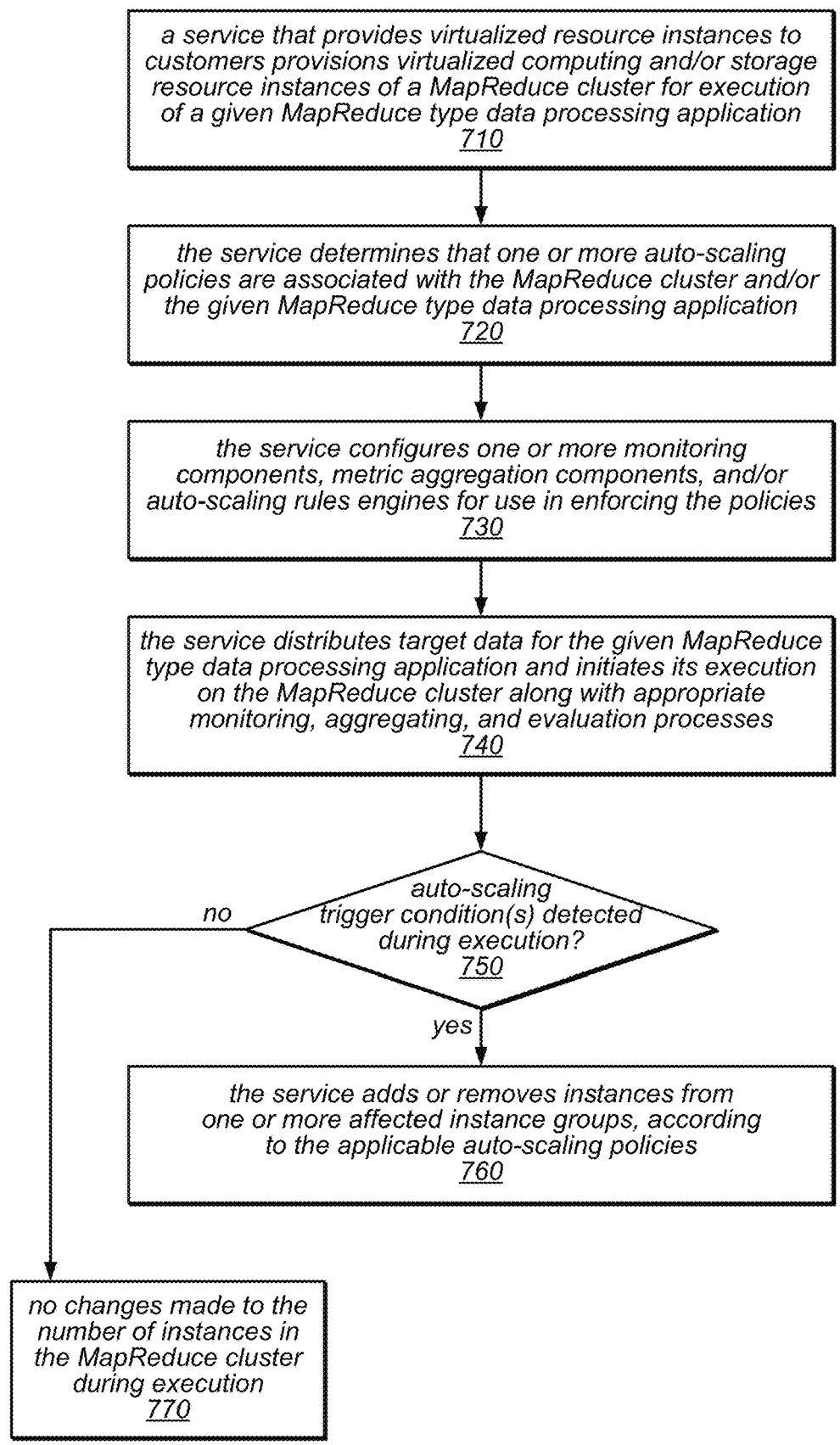
FIG. 7 is a flow diagram illustrating one embodiment of a method for performing auto-scaling in a MapReduce cluster.

One embodiment of a method for performing auto-scaling in a MapReduce cluster is illustrated by the flow diagram in FIG. 7. As illustrated at 710, in this example, the method may include a service that provides virtualized resource instances to customers provisioning virtualized computing and/or storage resource instances of a MapReduce cluster for execution of a given MapReduce type data processing application. The method may include the service determining that one or more auto-scaling policies are associated with the MapReduce cluster and/or the given MapReduce type data processing application, as in 720. For example, the service may determine (e.g., based on stored policy information or in response to receiving input defining or selecting one or more auto-scaling policies) that one or more default or client-specified policies are associated with the cluster (or with one or more instance groups thereof) or with the application, including, for example, one or more system-wide, cluster-specific, application-specific, and/or instance-group-specific policies that are dependent on metrics that emitted by the cluster (or resource instances thereof) or the application, or that are created through the aggregation of other metrics (e.g., metrics that are emitted by the cluster, its instances, or the application, or that are received or obtained from alternate sources).

As illustrated in this example, the method may include the service configuring one or more monitoring components (e.g., metrics collection agents), metric aggregation components, and/or auto-scaling rules engines for use in enforcing the associated auto-scaling policies, as in 730. Note that, in various embodiments, any or all of the monitoring components, metrics aggregation components, and/or auto-scaling rules engines may be components of the cluster itself (or may be components of particular resource instances or instance groups), or may be external to the cluster. For example, in some embodiments, metrics collection agents may be implemented within the cluster (or resource instances thereof), and may pass metrics information to one or more metric aggregation components and/or auto-scaling rules engines that are external to the cluster.

As illustrated in FIG. 7, the method may include the service distributing target data for the given MapReduce type data processing application and initiating its execution on the MapReduce cluster, as in 740. In addition, the service may invoke the monitoring, aggregating, and evaluation processes that will be used to implement auto-scaling for the cluster. If no auto-scaling trigger conditions (e.g., those defined by expressions within the auto-scaling policies) are detected during execution of the given application, shown as the negative exit from 750, they may not be any changes may made to the number of instances in the MapReduce cluster during execution, as in 770. However, if one or more auto-scaling trigger conditions is detected during execution, shown as the positive exit from 750, the method may include the service adding or removing instances from one or more affected instance groups, according to the applicable auto-scaling policies, as in 760. In some embodiments, multiple auto-scaling trigger conditions may be detected at the same time and/or at different times during the execution of the given application (e.g., trigger conditions that are detected on nodes within different instance groups and/or that affect different instance groups) and different policies may be applied in each case, as appropriate.

As previously noted, the systems described herein may implement clusters of computing resource instances that include two or more instance groups, each containing a subset (e.g., an overlapping or non-overlapping subset) of instances (e.g., instances that may be designed for use with a particular type of workload). In some embodiments, some instance groups may be running particular services while others are not. For example, one instance group may be using spot instances, while another instance group may be using on-demand instances. As described herein, particular auto-scaling policies and corresponding auto-scaling actions may target particular ones of the instance groups within a cluster. For example, if an application is running out of HDFS capacity and needs to add more HDFS capacity, the use of a targeted auto-scaling policy may allow nodes to be added only to the instance group or groups that are running RDFS. Likewise, if one instance group in a cluster is running a file system and another instance group is not (which may be very common), when the cluster is scaled down, (e.g., because the CPU is idle), the use of targeted auto-scaling policies may allow the shrink operation to target the instance group that is not running the file system, so that data is not lost.

In some embodiments, targeted auto-scaling policies may allow a distributed computing system to introduce some intelligence into capacity reduction operations. For example, the system may implement a "smart shrink" technique in which, in response to determining that capacity should be reduced in a cluster, the system may prioritize nodes for removal that do not store state (e.g., data) or that are not necessary to maintain a predetermined replication or quorum requirement for the data they store. In another example, in response to determining that capacity should be reduced in a cluster, the system may prioritize nodes for removal dependent on whether they are currently executing task on behalf of a distributed application, whether they have recently begun performing (or are about to perform) tasks, whether they are currently performing tasks and/or whether they are almost finished with their tasks, in some embodiments.

In one example embodiment, a cluster made up of two instance groups, one of which includes nodes storing data, and the other of which includes nodes that do not store data. The instance group that includes nodes carrying data may be associated with a policy specifying that capacity should be increased if the disk usage is more than 75%", while the other instance group (the one including nodes that do not carry data) may be associated with a policy specifying that when the CPU is not being used, the node should be removed. Note that, in some embodiments, before removing a node that stores data, either the data may need to be moved to a different node or the system may need to determine that removing the node will not cause a loss of data or a violation of a replication requirement or requirement to maintain enough copies of the data to reach a quorum. In some embodiments, rather than removing a node that stores data and that cannot be gracefully decommissioned (e.g., due to other requirements), another node may be selected for removal instead (e.g., a different node that stores data but that can be gracefully decommissioned, or a node that does not store data).

In some embodiments, the system may rely on HDFS decommissioning (which is built into Hadoop) to determine which, if any, storage nodes are eligible for removal when reducing the capacity of a cluster and/or to prepare storage nodes for removal. For example, in some embodiments, when shrinking a cluster, the system may rely on the mechanisms built into HDFS to prevent data loss (e.g. through replication). In some such embodiments, when a node is forcibly terminated, this mechanism may be configured to redistribute the data stored on the node to match a target replication factor (the number of times a given data block must be replicated across the cluster). More specifically, in embodiments that rely on HDFS decommissioning, this mechanism may first evaluate whether the available storage is sufficient to accommodate the replication needs. If so, it may begin decommissioning nodes, waiting until the rebalancing of the data from each decommissioned node has been completed before each node is terminated.

In some embodiments, a variety of factors may be considered when determining which, if any, instance should be removed when an auto-scaling policy indicates that capacity should be reduced. For example, some auto-scaling policies may place a value on each node (e.g., relative to its eligibility or suitability for removal) and the policies may rely on the value of the when making decisions about which instances to remove (e.g., avoiding data loss on nodes that carry data). In some embodiments, this ability to apply a scaling down operation dependent on the relative values of different nodes, rather than indiscriminately, may be important to customers who wish to safely tune their cluster capacity (without worrying about data loss or a significant loss in performance, for example).

In some embodiments, the systems described herein may also be more discriminating than those that implement existing auto-scaling solutions when removing compute nodes (e.g., those that are performing tasks on behalf of a distributed application). For example, the auto-scaling policies may be configured to avoid removing nodes that are actually performing a job (which may impact performance because that job may need to be rescheduled for execution on another node). In such embodiments, the system may be configured to prioritize nodes for removal that are doing no work (or less work than other nodes) or that have just begun performing a job over nodes whose currently executing jobs are nearing completion (e.g., those whose currently executing jobs are 80% complete). For example, a priority order may be established for node removal or eligibility for node removal, and may be periodically (or occasionally) updated as execution of the distributed application progresses, in some embodiments. This may allow multiple nodes to be removed safely (e.g., one at a time, in priority order, while confirming that they are still eligible for removal), in some embodiments. Note that in various embodiments, the actual launching and termination of particular resource instances may be performed using APIs that are built into the underlying virtualization services (e.g., APIs for provisioning and/or deprovisioning virtualized resource instances of various types). In some embodiments, an agent of the auto-scaling process may be configured to keep track of nodes that have currently executing tasks in progress so that at any given time, it may be possible to determine the appropriate targets for termination. In the case of a shrink that affects those nodes, the agent may begin marking them for subsequent termination, and then may terminate them once execution of the corresponding task is complete.

Figure 8:
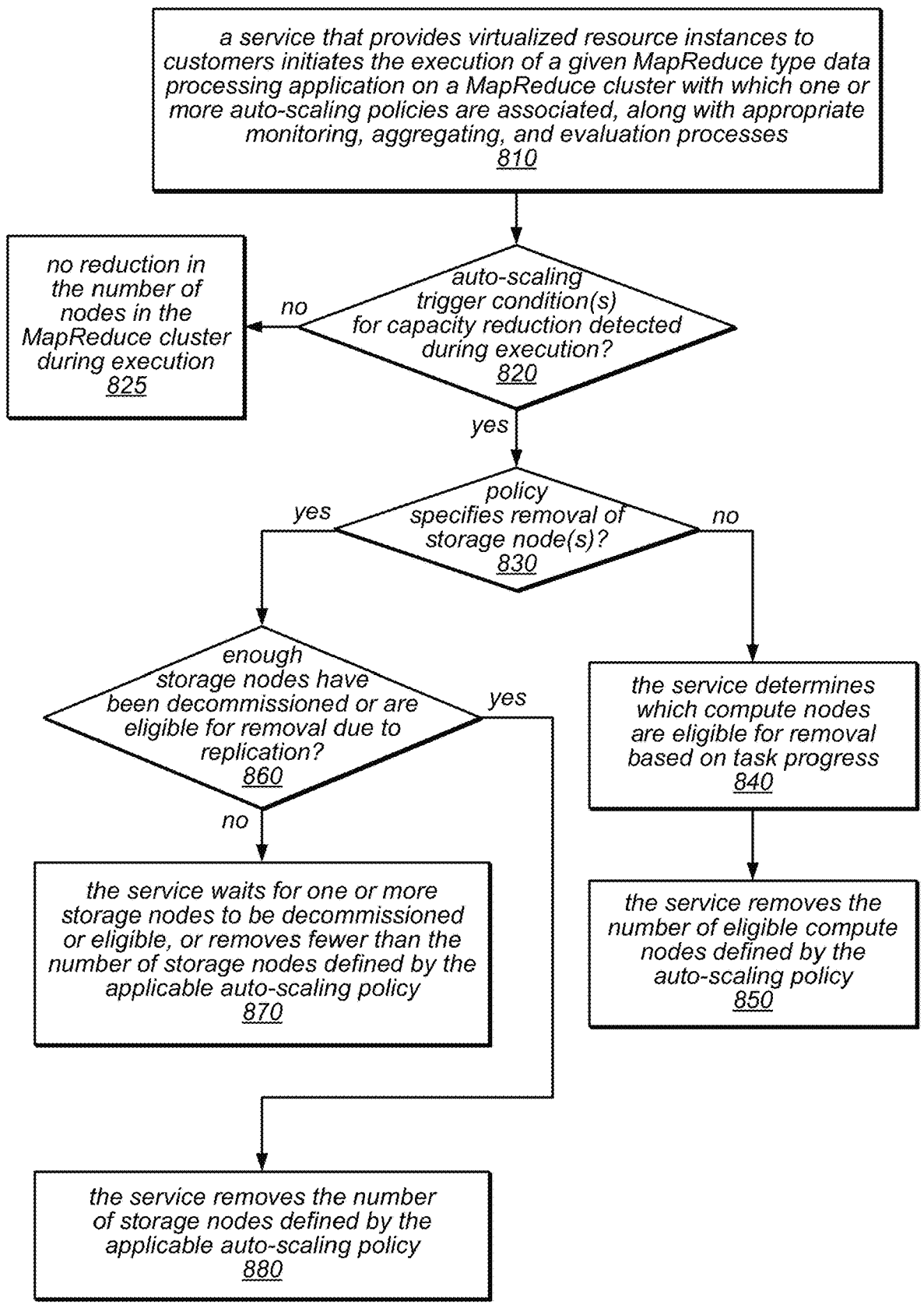
FIG. 8 is a flow diagram illustrating one embodiment of a method for performing an intelligent scale-down operation in a MapReduce cluster.

One embodiment of a method for performing an intelligent scale-down operation (e.g., a "smart shrink") in a MapReduce cluster is illustrated by the flow diagram in FIG. 8. As illustrated at 810, in this example, the method may include a service that provides virtualized resource instances to customers initiating the execution of a given MapReduce type data processing application on a MapReduce cluster with which one or more auto-scaling policies are associated, along with appropriate monitoring, aggregating, and evaluation processes. If no auto-scaling trigger conditions that would cause a reduction in capacity of the cluster are detected during execution of the application, shown as the negative exit from 820, there may be no reduction in the number of nodes in the MapReduce cluster during execution, as shown at 825.

As illustrated in this example, however, if one or more auto-scaling trigger conditions is detected during execution (shown as the positive exit from 820), and if the policy specifies the removal of one or more storage nodes in one or more instance groups within the MapReduce cluster (shown as the positive exit from 830), the method may include determining whether there are enough storage nodes available to remove (according to the applicable auto-scaling policy) in a manner such that no data will be lost by their removal, as in 860. For example, the method may include determining whether there are enough storage nodes that have already been decommissioned or that are otherwise eligible for removal from the cluster (or from one or more affected instance groups thereof) due to replication. If so, shown as the positive exit from 860, the method may include the service removing the number of storage nodes defined by the applicable auto-scaling policy, as in 880. However, if there are not enough storage nodes (according to the applicable auto-scaling policy) that are eligible for removal from the cluster or applicable instance groups thereof (shown as the negative exit from 860), the method may include the service waiting for one or more storage nodes to be decommissioned or to become eligible for removal, or the service removing fewer than the number of storage nodes defined by the applicable auto-scaling policy, as in 870. Note that, in some embodiments, if there are not enough storage nodes eligible for removal from the cluster or applicable instance groups thereof, the service may be configured to initiate the decommissioning of one or more storage nodes in the cluster or instance group(s) and then may wait for the node(s) to be decommissioned (not shown).

As illustrated in this example, if one or more auto-scaling trigger conditions are detected during execution (shown as the positive exit from 820) and if the policy does not specify the removal of one or more storage nodes within the MapReduce cluster (i.e., if the policy specifies removal of one or more compute nodes in one or more instance groups within the MapReduce cluster, shown as the positive exit from 830), the method may include the service determining which compute nodes within the cluster or affected instance group(s) are eligible for removal based on task progress (as in 840), after which the service may remove the number of eligible compute nodes defined by the auto-scaling policy, as in 850. For example, compute nodes that are not currently performing tasks or that have just begun performing tasks may be prioritized for removal over compute nodes that are currently performing tasks and/or that are almost finished with their tasks, in some embodiments.

While many of the examples included here describe cluster auto-scaling techniques in terms of their application to Hadoop/MapReduce clusters, these techniques may be more broadly applied to auto-scaling within other types of cluster-oriented distributed computing systems, in other embodiments. For example, they may be applicable for use with Spark and/or Presto applications, which are outside of Hadoop, but are distributed applications that a customer may wish to automatically scale up or down based on certain rules. As previously noted, the metrics that are of interest to customers in making auto-scaling decisions when executing these (or other) applications may be different than those that are of interest to customers in making auto-scaling decisions for Hadoop/MapReduce clusters. Therefore, in such embodiments, the distributed computing system may be configured to emit and/or collect a different set of default metrics and/or to provide different default auto-scaling policies than those provided for use in Hadoop/MapReduce clusters. In some embodiments, such systems may employ an existing monitoring service to select, define, and/or collect the metrics that are appropriate for these application. These systems may also allow a customer to apply different auto-scaling policies to different instance groups, which may be useful for those applications in which the customer wants to distinguish between very precious nodes or instance types and others that are not as precious when targeting instances or instance groups in an auto-scaling operation (e.g., when removing nodes).

Figure 9:
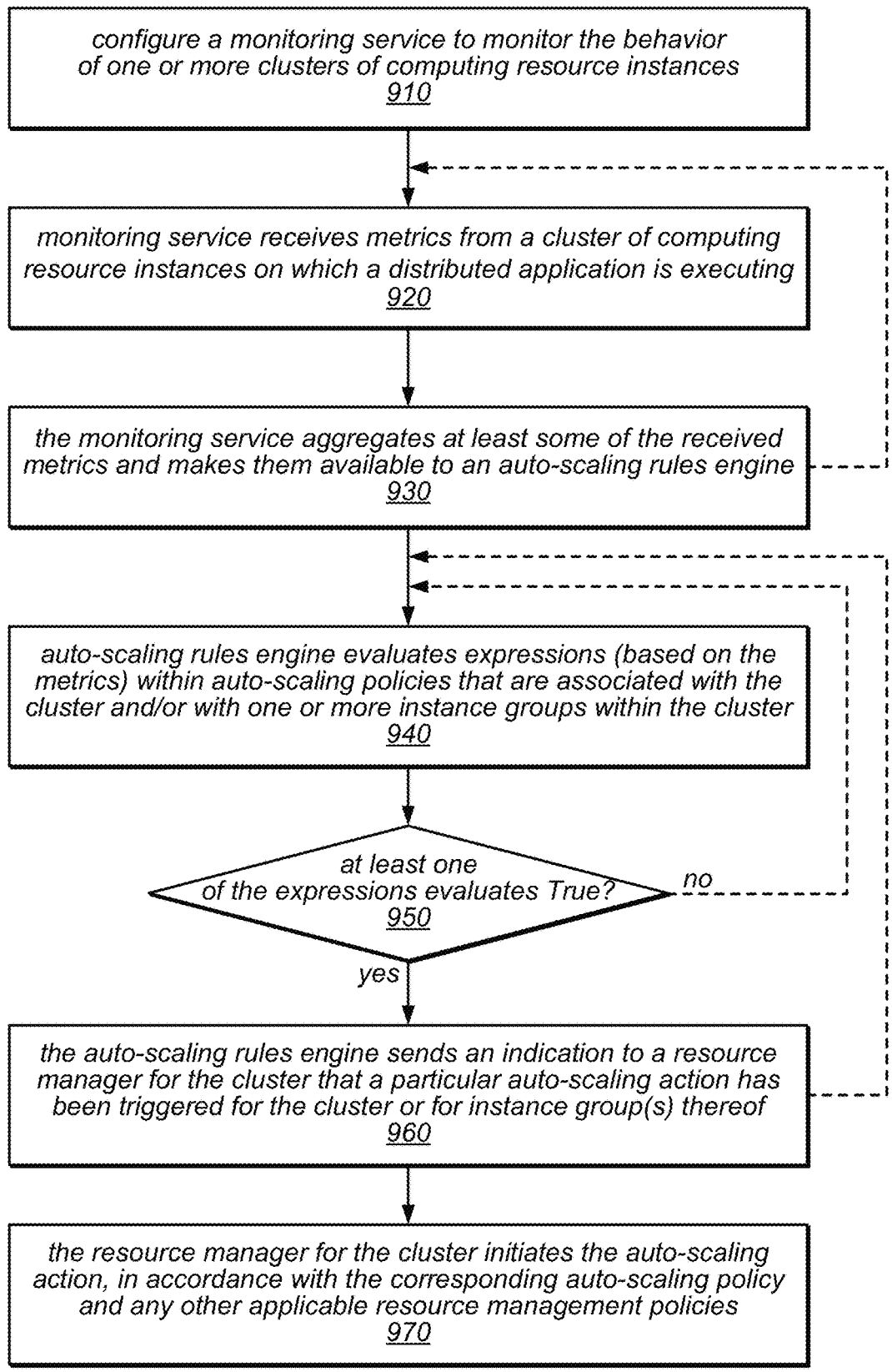
FIG. 9 is a flow diagram illustrating one embodiment of a method for employing a monitoring service in implementing auto-scaling for clusters of computing resource instances.

One embodiment of a method for employing a monitoring service in implementing auto-scaling for clusters of computing resource instances is illustrated by the flow diagram in FIG. 9. As illustrated at 910, in this example, the method may include configuring a monitoring service to monitor the behavior of one or more clusters of computing resource instances. The method may include the monitoring service receiving metrics from a cluster of computing resource instances on which a distributed application is executing, as in 920. For example, the monitoring service may receive metrics from one or more computing resource instances within the cluster (some of which may belong to different instance groups). The method may also include the monitoring service aggregating at least some of the received metrics and making them available to an auto-scaling rules engine (e.g., by passing them to the auto-scaling rules engine or by storing them in a memory that is accessible to the auto-scaling rules engine), as in 930. As illustrated in FIG. 9 by the feedback from 930 to 920, the monitoring service may continue to receive metrics from the cluster, aggregate them, and/or make them available to the auto-scaling rules engine as long as it is configured to do so.

As illustrated in FIG. 9, the method may include the auto-scaling rules engine evaluating expressions (e.g., expressions that are based on the received and/or aggregated metrics and that represent auto-scaling trigger conditions) defined within one or more auto-scaling policies that are associated with the cluster and/or with one or more instance groups within the cluster, as in 940. If at least one of the expressions evaluates True, shown as the positive exit from 950, the method may include the auto-scaling rules engine sending an indication to a resource manager for the cluster that a particular auto-scaling action has been triggered for the cluster or for one or more instance groups thereof, as in 960. The method may also include the resource manager for the cluster initiating the auto-scaling action, in accordance with the corresponding auto-scaling policy and any other applicable resource management policies, as in 970. As illustrated in FIG. 9 by the feedback from 960 and from the negative exit of 950 to 940, the auto-scaling rules engine may continue to evaluate various expressions within the auto-scaling policies associated with the cluster while it is configured to do so, whether or not any of them evaluate to True, and the operations illustrated in 960 and 970 may be repeated if and when any of them evaluate to True.

Figure 10:
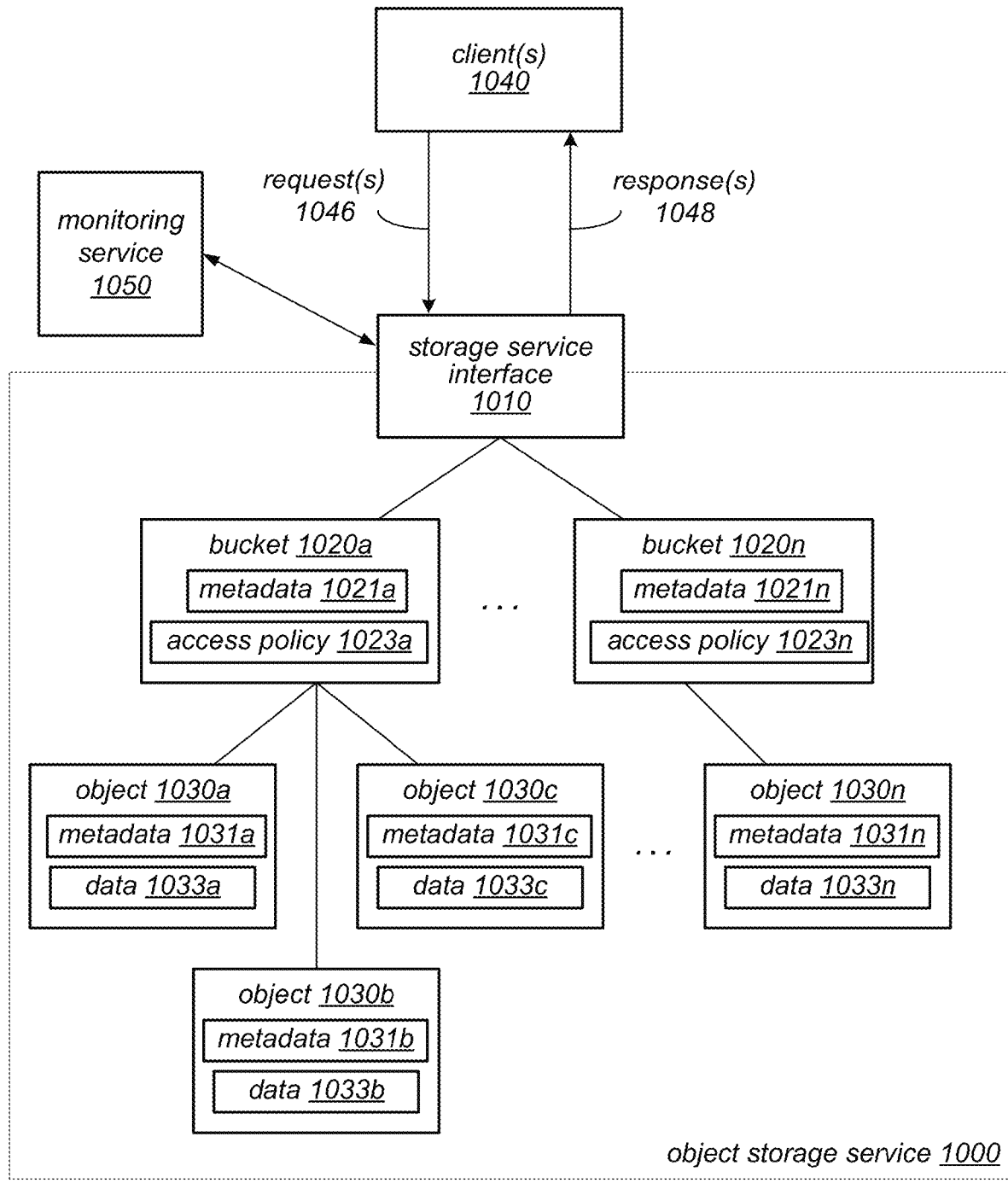
FIG. 10 illustrates an example embodiment of an object storage model for providing virtualized storage resources to clients as a service.

One example embodiment of an unstructured object storage model for providing virtualized storage resources to clients as a service, such as a web service, is illustrated by the block diagram in FIG. 10. In the illustrated model, storage service interface 1010 is provided as a client-facing interface to object storage service 1000. Storage service interface 1010 may, for example, be implemented as, or alternatively may include, an application programming interface (API). According to the model presented to a client 1040 by interface 1010, the storage service may be organized as an arbitrary number of buckets 1020a-1020n accessible via interface 1010. In general, a bucket is a logical container in which objects may be stored in a storage system on behalf of a user, where the objects are the fundamental entities stored in the storage system. In some embodiments, the stored objects may include object data and/or metadata. For example, each object may include a data object portion, and a metadata portion In some embodiments, every object may be contained in a bucket, and every object may be addressable using a combination of a bucket identifier and one or more identifiers of the object itself (e.g., a user key or a combination or a user key and a version identifier).

In the example illustrated in FIG. 10, each bucket 1020 may be configured to store an arbitrary number of objects 1030a-1030n, each of which may store data specified by a client 1040 of the storage service 1000 (shown as data 1033a-1033n) and/or metadata (shown as 1031a-1031n). In various embodiments, metadata 1031a-1031n may be specified by a client 1040 or may be generated by object storage service 1000. One or more clients 1040 may submit requests to the storage service interface to store, retrieve, and, as described in more detail below, perform one or more operations on data object 1030. Storage service interface may provide responses 1048 to the requests, which may include acknowledgements and/or retrieved data, for example. Generally, in addition to storage and retrieval of data objects, the requests or commands that the storage service 1000 may perform may include commands that modify data within the storage service 1000. In this way, the clients 1040 are not burdened with removing the data from the storage service 1000, performing the operations, and then returning the modified data to the storage service. This configuration may save network bandwidth and processing resources for the clients 1040, for example.

In some embodiments storage service interface 1010 may be configured to support interaction between the storage service 1000 and its client(s) 1040 according to a web services model. For example, in one embodiment, interface 1010 may be accessible by clients as a web services endpoint having a Uniform Resource Locator (URL) to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol.

In at least some embodiments, the object storage service 1000 may be configured to internally replicate data objects for data redundancy and resiliency purposes. However, the object storage service 1000 does not guarantee that an access of a data object stored in the storage service 1000 will always return a latest or most recent version of the data object. This property of a storage service such as object storage service 1000 may be referred to herein as "eventual consistency", as a data object is generally guaranteed to be only eventually consistent across all instances. In other embodiments, object storage service 1000 may support a strong consistency model, which may guarantee that an access of a data object stored in the storage service will return a latest or most recent version of the data object.

In some embodiments, an object storage service (such as object storage service 1000) may provide storage for a data set that is to be downloaded and processed by a MapReduce application (or computation thereof) that is executing on a distributed computing system (such as a MapReduce cluster) and/or output data that is produced by such applications. In some embodiments, an object storage service (such as object storage service 1000) may provide storage for other types of data or metadata, including, but not limited to, key pairs, hostfiles, rankfiles, or configuration or operating parameters for a MapReduce job, or any other information usable when executing such applications. In other embodiments, any or all of these elements may be stored in one or more object data stores having a different model and/or configuration than that illustrated in FIG. 10.

In some embodiments, the object storage service may include or interact with a monitoring component that is employed in implementing auto-scaling of clusters, as described herein. For example, a monitoring service 1050 may interact with object storage service 1000 (e.g., through storage service interface 1010) to gather and analyze metrics that are used in expressions representing auto-scaling trigger conditions or may gather such metrics and pass them to a separate auto-scaling rules engine for analysis, after which the auto-scaling rules engine may determine whether and when there is a need to perform auto-scaling actions (not shown). In some embodiments, an auto-scaling rules engine may be implemented within a separate auto-scaling service by the service provider, and the object storage service 1000 may be a client of the auto-scaling service.

Note that, in some embodiments, the data object portion of an object may be opaque to the storage system, i.e. it may be treated as a "black box" entry by the storage system. In various embodiments, the default metadata of an object may include, e.g., a name-value pair, the date the object was last modified, and/or an indicator of the content type (i.e., the data type of the contents of the data object portion of the object). In some embodiments, the metadata associated with an object may include system interjected key-value pairs (containing, for example, a creation date and/or a last modified date, or other versioning related metadata), along with user supplied key-value pairs. In some embodiments, metadata associated with and/or stored in an object may include an access control list (ACL). In some embodiments, a developer may be able to specify custom metadata at the time an object is stored. In various embodiments, the amount of metadata that can be associated with a given object may be restricted by the limits of the interface used, and/or the amount of data allowed or supported by the system for a request or response message.

In various embodiments, the storage systems described herein may include support for the following storage related tasks: creating buckets, storing and retrieving data in buckets (e.g., using a unique key, which may be assigned by the developer of the data or owner of the bucket), deleting data, and/or listing stored objects. In some embodiments, a user may need to have special permission (e.g., a particular access role) to be able to perform certain operations in the storage system. For example, a user may need to be designated as a privileged user in the system (and/or for a particular bucket in the system) in order to check a versioning state, modify a versioning state, delete objects and/or keys, retrieve logically deleted data, set permissions on buckets or objects thereof, etc. In another example, a user may need to have a particular access role in order to list stored objects and/or retrieve stored objects. In some embodiments, such permissions may be automatically granted to and/or controlled by the bucket owner. In other embodiments, such privileges may be designated and/or granted to users by other means and/or based on factors other than bucket ownership. In various embodiments, some or all of these permissions may be granted and/or controlled on a bucket basis. In other embodiments, one or more of these permissions may be granted and/or controlled on an individual object basis, or on the basis of the object type or content type.

Figure 11:
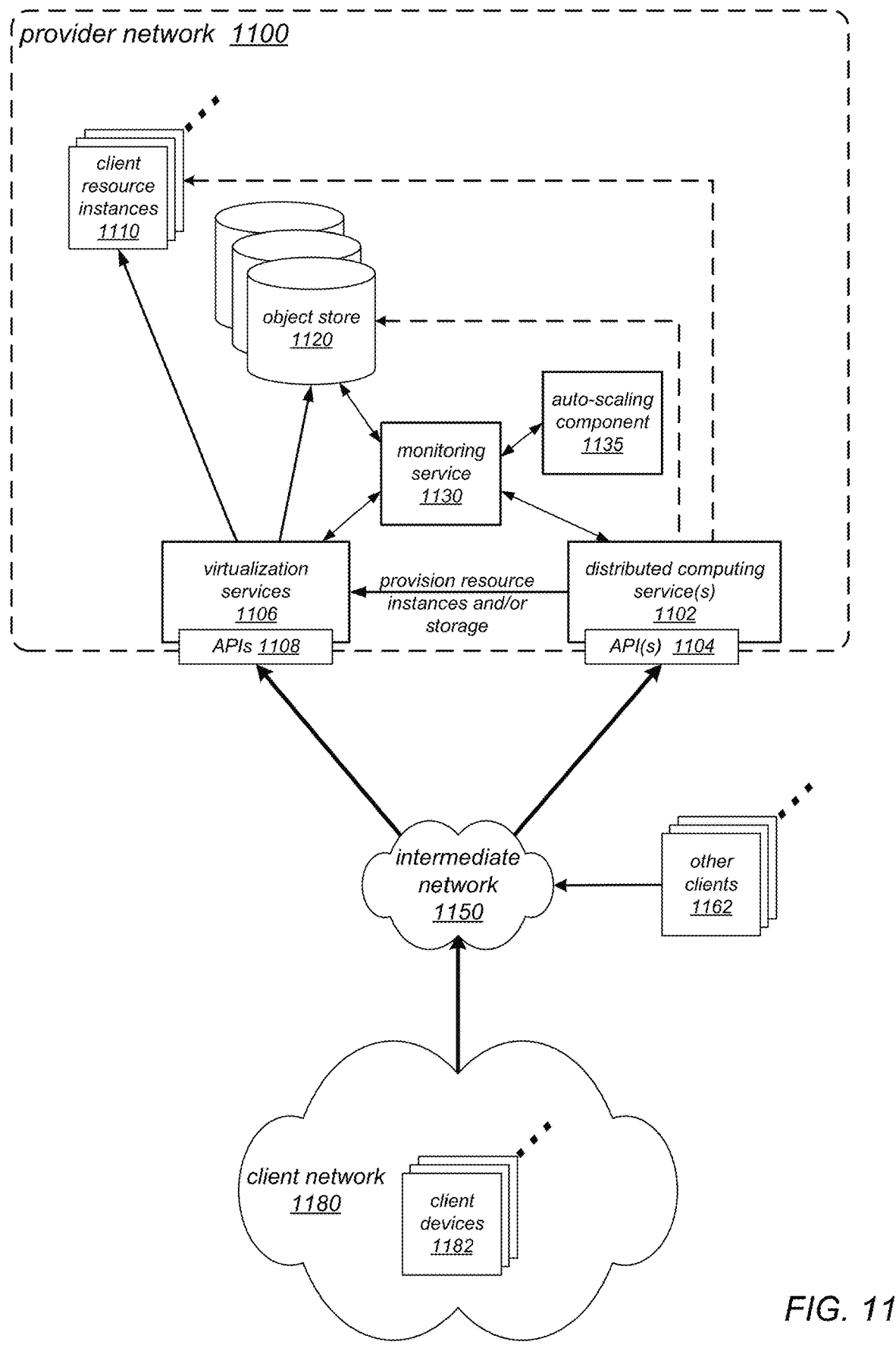
FIG. 11 illustrates an example service provider network environment in which embodiments of methods and apparatus for providing data storage in distributed computing systems may be implemented.

Embodiments of a distributed computing system are generally described herein in the context of a service provider that provides to clients, via an intermediate network such as the Internet, virtualized resources (e.g., virtualized computing and storage resources) implemented on a provider network of the service provider. FIG. 11 illustrates an example service provider network environment in which embodiments of methods and apparatus for providing data storage in distributed computing systems may be implemented. Other example environments in which embodiments of a distributed computing system that executes MapReduce jobs on a MapReduce cluster may be implemented are illustrated in other ones of the drawings and are described below. These examples are not intended to be limiting.

In the example illustrated in FIG. 11, the service provider may provide one or more services (referred to as distributed computing service(s) 1102) to clients (e.g., clients 1182 on client network 1180 or other clients 1162) via which the clients may provision, manage, and operate distributed computing systems at least partially on a provider network 1100. In at least some embodiments, provisioning a distributed computing system via the distributed computing service(s) 1102 may include provisioning one or more virtualized computing resources (shown as client resource instances 1110) as compute nodes for the distributed computing system and provisioning virtualized storage (shown as data store 1120) as data storage for data sets used in the distributed computing system and/or as data storage for results of computations performed on behalf of various clients. Note that client resource instances 1110 and/or data store 1120 may be otherwise provisioned in various embodiments. For example, as an alternative, in at least some embodiments, a client (e.g., as represented by client network 1180) may provision one or more client devices 1182 on an external client network as compute nodes for the distributed computing service, while provisioning storage for the data set to be used in the distributed computing system on a data store 1120 via distributed computing service(s) 1102. Note that, in various embodiments, data store 1120 may implement object storage, block-based storage, and/or volume-based storage, as described herein.

Note that, in at least some embodiments, client(s) may interact with distributed computing service(s) 1102 via one or more application programming interfaces (API(s) 1104) to request provisioning of computation and storage resources on provider network 1100 for specific distributed computing systems (e.g., MapReduce clusters), and distributed computing service(s) 1102 may in turn interact with virtualization service(s) 1106 via API(s) 1108 to actually provision the computation and storage resources on provider network 1100. However, in some embodiments, distributed computing service(s) 1102 may directly interact with computation and storage resources on provider network to provision or otherwise configure the resources for specific distributed computing systems.

In at least some embodiments, the service provider may implement such distributed computing systems (e.g., MapReduce clusters) on behalf of clients according to a distributed computing framework, for example the Apache™ Hadoop® framework. Note, however, that other frameworks may be used in some embodiments.

Figure 16:
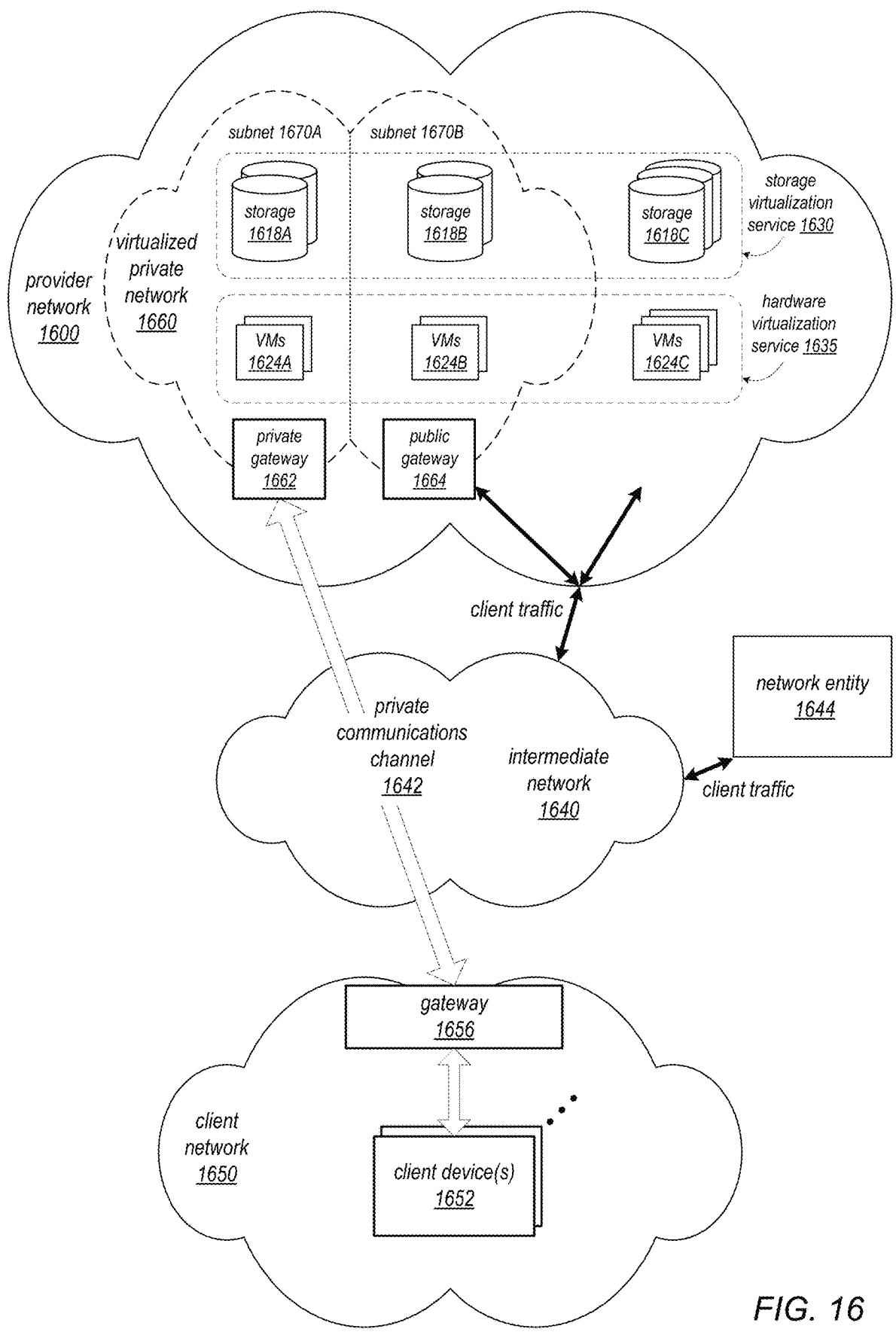
FIG. 16 is a block diagram illustrating an example provider network that provides virtualized private networks to at least some clients, according to at least some embodiments.

In at least some embodiments, at least some of the resources provided to clients of the service provider via the provider network 1100 may be virtualized computing resources implemented on multi-tenant hardware that is shared with other client(s) and/or on hardware dedicated to the particular client. Each virtualized computing resource may be referred to as a resource instance or as a client resource instance (e.g., client resource instances 1110). Resource instances 1110 may, for example, be rented or leased to clients of the service provider. For example, clients of the service provider may access one or more services 1106 of the provider network via API(s) 1108 to the services 1106 to obtain and configure resource instances 1110 and to establish and manage virtual network configurations that include the resource instances 1110, for example virtualized private networks as illustrated in FIG. 16. The resource instances 1110 may, for example, be implemented according to hardware virtualization technology that enables multiple operating systems to run concurrently on a host computer, i.e. as virtual machines (VMs) on the hosts. A hypervisor, or virtual machine monitor (VMM), on a host presents the VMs on the host with a virtual platform and monitors the execution of the VMs. Each VM may be provided with one or more private IP addresses; the VMM on a host may be aware of the private IP addresses of the VMs on the host. Examples of the implementation and use of hardware virtualization technologies are further illustrated in FIG. 13 and described below.

In at least some embodiments, at least some of the resources provided to clients of the service provider via the provider network 1100, virtualization service(s) 1106, and API(s) 1108, may be virtualized storage resources implemented on storage hardware on the provider network 1100 that may be shared with other client(s). Virtualized data store technology may be used in various embodiments to provide different types of data storage and storage services for clients. For example, an object storage service may provide general, unstructured data object-based storage (which may be representing in FIG. 11 by data store 1120) to clients via which the clients may store and retrieve arbitrary types of data objects (some of which may include data files). As illustrated in FIG. 11, the unstructured object store (shown as data store 1120) provided by the object storage service may, for example, be used to store data sets for distributed computing systems provisioned through the distributed computing service(s) 1102. As another example, not shown in FIG. 11, a data storage service, for example a database service provided by the service provider or by some other entity, may provide a structured data model (e.g., a database model) to the clients for storing and retrieving structured data.

As illustrated in FIG. 11, in some embodiments, provider network 1100 may include a monitoring service 1130 and/or an auto-scaling component 1135. For example, in some embodiments, monitoring service 1130 may be configured to gather and analyze metrics that are used in expressions representing auto-scaling trigger conditions or may gather such metrics and pass them to a separate auto-scaling rules engine for analysis, after which the auto-scaling rules engine may determine whether and when there is a need to perform auto-scaling actions (not shown). In some embodiments, distributed computing services 1102 and/or virtualization services 1106 may be clients of monitoring service 1130. In some embodiments, auto-scaling component 1135 may perform any auto-scaling actions that are determined using the any of the auto-scaling techniques described herein. In some embodiments, the auto-scaling rules engine may be implemented within auto-scaling component 1135, rather than within monitoring service 1130.

In the example provider network illustrated in FIG. 11, the distributed computing system may include one or more compute nodes. The compute nodes may be provisioned as client resource instances 1110 as shown in FIG. 11, or alternatively may be provisioned as client devices 1182 on a client network 1180 or on clients 1162 as shown in FIG. 11. A data set for the distributed computing system may be instantiated on data store 1120. In some embodiments, to process data from the data set, compute nodes may access data store 1120 via an object storage service (not shown). In at least some embodiments, such an object storage service may provide one or more one or more APIs via which the compute nodes or other entities may access data store 1120. In some embodiments, processed data (e.g., output data) may be, but is not necessarily, written back to data store 1120. In some cases, at least some of the processed data that is written back to data store 1120 may be accessed by one or more of the compute node(s). For example, a job (e.g., a MapReduce job) may read data from data store 1120 and write output data to data store 1120. A subsequent job (e.g., another MapReduce job) may then attempt to access at least some of the output data from data store 1120.

An unstructured object store provided via an object storage service may have advantages, including, but not limited to, the ability to store very large data sets, high throughput, reliability and high availability due to features such as data replication, and flexibility. A client may leverage such an object storage service to easily, and relatively inexpensively, provision additional storage as needed without having to install and configure additional storage devices on the client's network. An object storage service, because of features such as data replication, may, in some embodiments, have the property of eventual consistency, in some embodiments. In other embodiments, it may implement a strong consistency model. In at least some embodiments, each of the compute nodes provisioned as client resource 1110 may include one or more processing modules that may implement processing portions of the distributed computing system (for example MapReduce procedures). A compute node may also include one or more data access modules that access a data storage service to obtain metadata or access data objects (or data files) maintained in data store 1120 by an object storage service on behalf of its processing module(s). In at least some embodiments, the object storage service may provide one or more APIs via which data access module(s) on various compute nodes provisioned as client resource 1110 may access the respective services.

Figure 12:
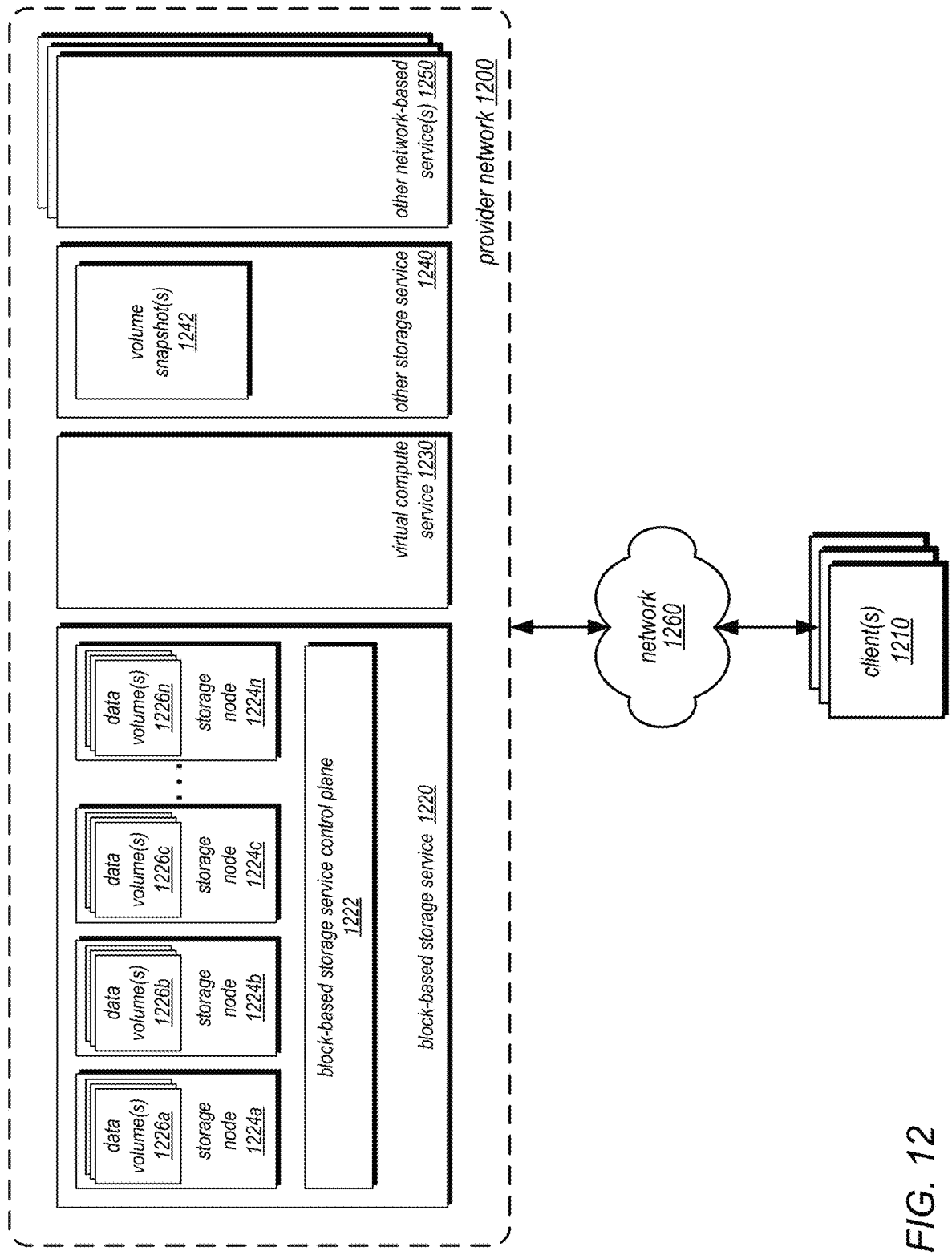
FIG. 12 is a block diagram illustrating a provider network that implements multiple network-based services including a block-based storage service, according to some embodiments.

FIG. 12 is a block diagram illustrating a provider network that implements multiple network-based services including a block-based storage service, according to some embodiments. Provider network 1200 may be set up by an entity such as a company or a public sector organization to provide one or more services (such as various types of cloud-based computing or storage) accessible via the Internet and/or other networks to clients 1210. Provider network 1200 may include numerous data centers hosting various resource pools, such as collections of physical and/or virtualized computer servers, storage devices, networking equipment and the like (e.g., computer system 1700 described below with regard to FIG. 17), needed to implement and distribute the infrastructure and services offered by the provider network 1200. In some embodiments, provider network 1200 may provide computing resources, such as virtual compute service 1230, storage services, such as block-based storage service 1220 and other storage service 1240 (which may include various storage types such as object/key-value based data stores or various types of database systems), and/or any other type of network-based services 1250. Clients 1210 may access these various services offered by provider network 1200 via network 1260. Likewise, network-based services may themselves communicate and/or make use of one another to provide different services. For example, computing resources offered to clients 1210 in units called "instances," such as virtual or physical compute instances or storage instances, may make use of particular data volumes 1226, providing virtual block storage for the compute instances.

As noted above, virtual compute service 1230 may offer various compute instances to clients 1210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 1230 in different embodiments, including general purpose or special purpose computer servers, storage devices, network devices and the like. In some embodiments instance clients 1210 or other any other user may be configured (and/or authorized) to direct network traffic to a compute instance. In various embodiments, compute instances may attach or map to one or more data volumes 1226 provided by block-based storage service 1220 in order to obtain persistent block-based storage for performing various operations.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications, without for example requiring the client 1210 to access an instance. Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristics, may vary. Configurations of compute instances may also include their location, in a particular data center, availability zone, geographic, location, etc., and (in the case of reserved compute instances) reservation term length.

In various embodiments, provider network 1200 may also implement block-based storage service 1220 for performing storage operations. As illustrated in this example, block-based storage service 1220 may be a storage system, composed of a pool of multiple independent storage nodes 1224a, 1224b, 1224c through 1224n (e.g., server block data storage systems), which provides block level storage for storing one or more sets of data volumes data volume(s) 1226a, 1226b, 1226c, through 1226n. Data volumes 1226 may be mapped to particular clients, providing virtual block-based storage (e.g., hard disk storage or other persistent storage) as a contiguous set of logical blocks. In some embodiments, a data volume 1226 may be divided up into multiple data chunks (including one or more data blocks) for performing other block storage operations, such as snapshot operations or replication operations. A volume snapshot of a data volume 1226 may be a fixed point-in-time representation of the state of the data volume 1226. In some embodiments, volume snapshots 1242 may be stored remotely from a storage node 624 maintaining a data volume, such as in another storage service 1240. Snapshot operations may be performed to send, copy, and/or otherwise preserve the snapshot of a given data volume in another storage location, such as a remote snapshot data store in other storage service 1240.

Block-based storage service 1220 may implement block-based storage service control plane 1222 to assist in the operation of block-based storage service 1220. In various embodiments, block-based storage service control plane 1222 assists in managing the availability of block data storage to clients, such as programs executing on compute instances provided by virtual compute service 1230 and/or other network-based services located within provider network 1200 and/or optionally computing systems (not shown) located within one or more other data centers, or other computing systems external to provider network 1200 available over a network 1260. Access to data volumes 1226 may be provided over an internal network within provider network 1200 or externally via network 1260, in response to block data transaction instructions.

Block-based storage service control plane 1222 may provide a variety of services related to providing block level storage functionality, including the management of user accounts (e.g., creation, deletion, billing, collection of payment, etc.). Block-based storage service control plane 1222 may further provide services related to the creation, usage and deletion of data volumes 1226 in response to configuration requests. Block-based storage service control plane 1222 may also provide services related to the creation, usage and deletion of volume snapshots 1242 on other storage service 1240. Block-based storage service control plane 1222 may also provide services related to the collection and processing of performance and auditing data related to the use of data volumes 1226 and snapshots 1242 of those volumes.

Provider network 1200 may also implement another storage service 1240, as noted above. Other storage service 1240 may provide a same or different type of storage as provided by block-based storage service 1220. For example, in some embodiments other storage service 1240 may provide an object-based storage service, which may store and manage data as data objects. For example, volume snapshots 1242 of various data volumes 1226 may be stored as snapshot objects for a particular data volume 1226. In addition to other storage service 1240, provider network 1200 may implement other network-based services 1250, which may include various different types of analytical, computational, storage, or other network-based system allowing clients 1210, as well as other services of provider network 1200 (e.g., block-based storage service 1220, virtual compute service 1230 and/or other storage service 1240) to perform or request various tasks.

Clients 1210 may encompass any type of client configurable to submit requests to network provider 1200. For example, a given client 1210 may include a suitable version of a web browser, or may include a plug-in module or other type of code module configured to execute as an extension to or within an execution environment provided by a web browser. Alternatively, a client 1210 may encompass an application such as a database application (or user interface thereof), a media application, an office application or any other application that may make use of compute instances, a data volume 1226, or other network-based service in provider network 1200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 1210 may be configured to generate network-based services requests according to a Representational State Transfer (REST)-style network-based services architecture, a document- or message-based network-based services architecture, or another suitable network-based services architecture. In some embodiments, a client 1210 (e.g., a computational client) may be configured to provide access to a compute instance or data volume 1226 in a manner that is transparent to applications implement on the client 1210 utilizing computational resources provided by the compute instance or block storage provided by the data volume 1226.

Clients 1210 may convey network-based services requests to provider network 1200 via external network 1260. In various embodiments, external network 1260 may encompass any suitable combination of networking hardware and protocols necessary to establish network-based communications between clients 1210 and provider network 1200. For example, a network 1260 may generally encompass the various telecommunications networks and service providers that collectively implement the Internet. A network 1260 may also include private networks such as local area networks (LANs) or wide area networks (WANs) as well as public or private wireless networks. For example, both a given client 1210 and provider network 1200 may be respectively provisioned within enterprises having their own internal networks. In such an embodiment, a network 1260 may include the hardware (e.g., modems, routers, switches, load balancers, proxy servers, etc.) and software (e.g., protocol stacks, accounting software, firewall/security software, etc.) necessary to establish a networking link between given client 1210 and the Internet as well as between the Internet and provider network 1200. It is noted that in some embodiments, clients 1210 may communicate with provider network 1200 using a private network rather than the public Internet.

In some embodiments, a block-based storage service such as that illustrated in FIG. 12 (and its underlying block-based storage system) may allow customers to create storage volumes and attach them to virtualized computing resource instances, including those that implement the compute nodes of a cluster of compute nodes in a distributed computing system. Once such storage volumes are attached, the customer may create a file system on top of these volumes, load them with applications or data, execute a database on them, or in general use them in any way that the customer might use a block device. In some embodiments, the storage volumes may be placed in a specific data center, availability zone, or region, and they may be automatically replicated in order to protect the customer's data from the failure of any single component.

In this example, one or more of block-based storage service control plane 1222 or a control plane of virtual compute service 1230, storage service(s) 1240, or other service(s) 1250 may include a monitoring component and/or rules engine for implementing cluster auto-scaling, or cluster auto-scaling (as described herein) may be implemented as a separate service on provider network 1200 (not shown). In some embodiments, block-based storage service 1220, virtual compute service 1230, storage service(s) 1240, and/ or other service(s) 1250 may be clients of such an external auto-scaling service.

In some embodiments, a service provider may offer multiple types of storage volumes, each type having different features and/or performance characteristics. In some embodiments, a block-based storage service may allow customers to create point-in-time snapshots and to use them to instantiate new volumes. Such snapshot may, for example, be used for geographical expansion, data center migration, and/or disaster recovery. A block-based storage service may also provide access to performance metrics for the storage volumes (such as bandwidth, throughput, latency, and queue depth). These and other metrics may be accessible through an API of a monitoring tool or through a GUI, command line, or other interface for the block-based storage service.

In some embodiments of the systems described herein, a distributed computing system that provides storage and computing services to customers may expose an API that explicitly allows a customer to define custom metrics to be collected, to define custom auto-scaling policies that depend on those metrics, and/or to indicate a particular subset of the instance groups within a cluster to which those policies should be applied.

In at least some embodiments, the data store described herein may be an implementation of the Hadoop® FileSystem API built on an unstructured object storage service. Note also that while many embodiments of techniques for auto-scaling clusters in a distributed computing system are described in terms of specific implementations of MapReduce systems and services built on the Apache™ Hadoop® framework, these techniques may be applied in order to perform auto-scaling for clusters on other implementations of MapReduce or in other types of cluster-based distributed computing frameworks, some (but not all) of which may include master compute nodes and worker (i.e., slave) compute nodes, in other embodiments.

In some embodiments, at least some of the metadata, data items and/or objects described herein may be stored on Solid State Drives (SSDs). In some embodiments, at least some of the metadata, data items and/or objects may be replicated, for example across three locations, for high availability and durability.

Example Provider Network Environments

This section describes example provider network environments in which embodiments of the methods and apparatus described herein (e.g., those employed in executing applications on a MapReduce cluster) may be implemented. However, these example provider network environments are not intended to be limiting.

Figure 13:
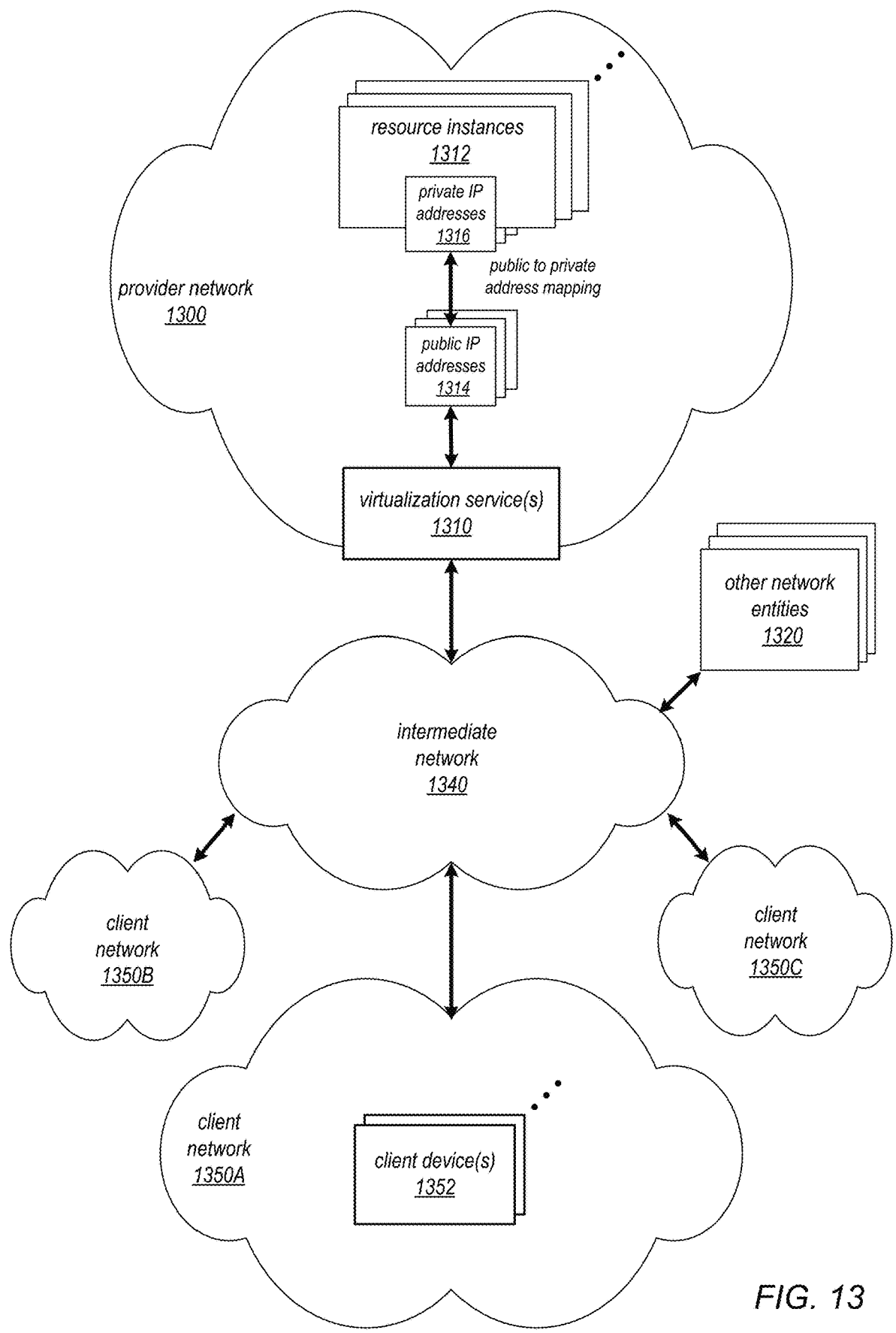
FIG. 13 illustrates an example provider network environment, according to at least some embodiments.

FIG. 13 illustrates an example provider network environment, according to at least some embodiments. A provider network 1300 may provide resource virtualization to clients via one or more virtualization services 1310 that allow clients to purchase, rent, or otherwise obtain instances 1312 of virtualized resources, including but not limited to computation and storage resources, implemented on devices within the provider network or networks in one or more data centers. Private IP addresses 1316 may be associated with the resource instances 1312; the private IP addresses are the internal network addresses of the resource instances 1312 on the provider network 1300. In some embodiments, the provider network 1300 may also provide public IP addresses 1314 and/or public IP address ranges (e.g., Internet Protocol version 4 (IPv4) or Internet Protocol version 6 (IPv6) addresses) that clients may obtain from the provider 1300.

Conventionally, the provider network 1300, via the virtualization services 1310, may allow a client of the service provider (e.g., a client that operates client network 1350A) to dynamically associate at least some public IP addresses 1314 assigned or allocated to the client with particular resource instances 1312 assigned to the client. The provider network 1300 may also allow the client to remap a public IP address 1314, previously mapped to one virtualized computing resource instance 1312 allocated to the client, to another virtualized computing resource instance 1312 that is also allocated to the client. Using the virtualized computing resource instances 1312 and public IP addresses 1314 provided by the service provider, a client of the service provider such as the operator of client network 1350A may, for example, implement client-specific applications and present the client's applications on an intermediate network 1340, such as the Internet. Other network entities 1320 on the intermediate network 1340 may then generate traffic to a destination public IP address 1314 published by the client network 1350A; the traffic is routed to the service provider data center, and at the data center is routed, via a network substrate, to the private IP address 1316 of the virtualized computing resource instance 1312 currently mapped to the destination public IP address 1314. Similarly, response traffic from the virtualized computing resource instance 1312 may be routed via the network substrate back onto the intermediate network 1340 to the source entity 1320.

Note that, although no monitoring components or auto-scaling rules engines are shown in FIG. 13, such components may be implemented within the control plane of virtualization services 1310, in some embodiments. In other embodiments, such components may be implemented as part of a separate auto-scaling service on provider network 1300, and the virtualization services 1310 may be clients of such a service.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients (e.g., client applications through which end users, service subscribers or third party services that are customers of the service interact with the service) of the provider network 1300; a client may then assign their allocated public IP addresses to particular resource instances allocated to the client. These public IP addresses may be referred to as client public IP addresses, or simply client IP addresses. Instead of being assigned by the provider network 1300 to resource instances as in the case of standard IP addresses, client IP addresses may be assigned to resource instances by the clients, for example via an API provided by the service provider. Unlike standard IP addresses, client IP Addresses are allocated to client accounts (e.g., customer accounts) and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 14:
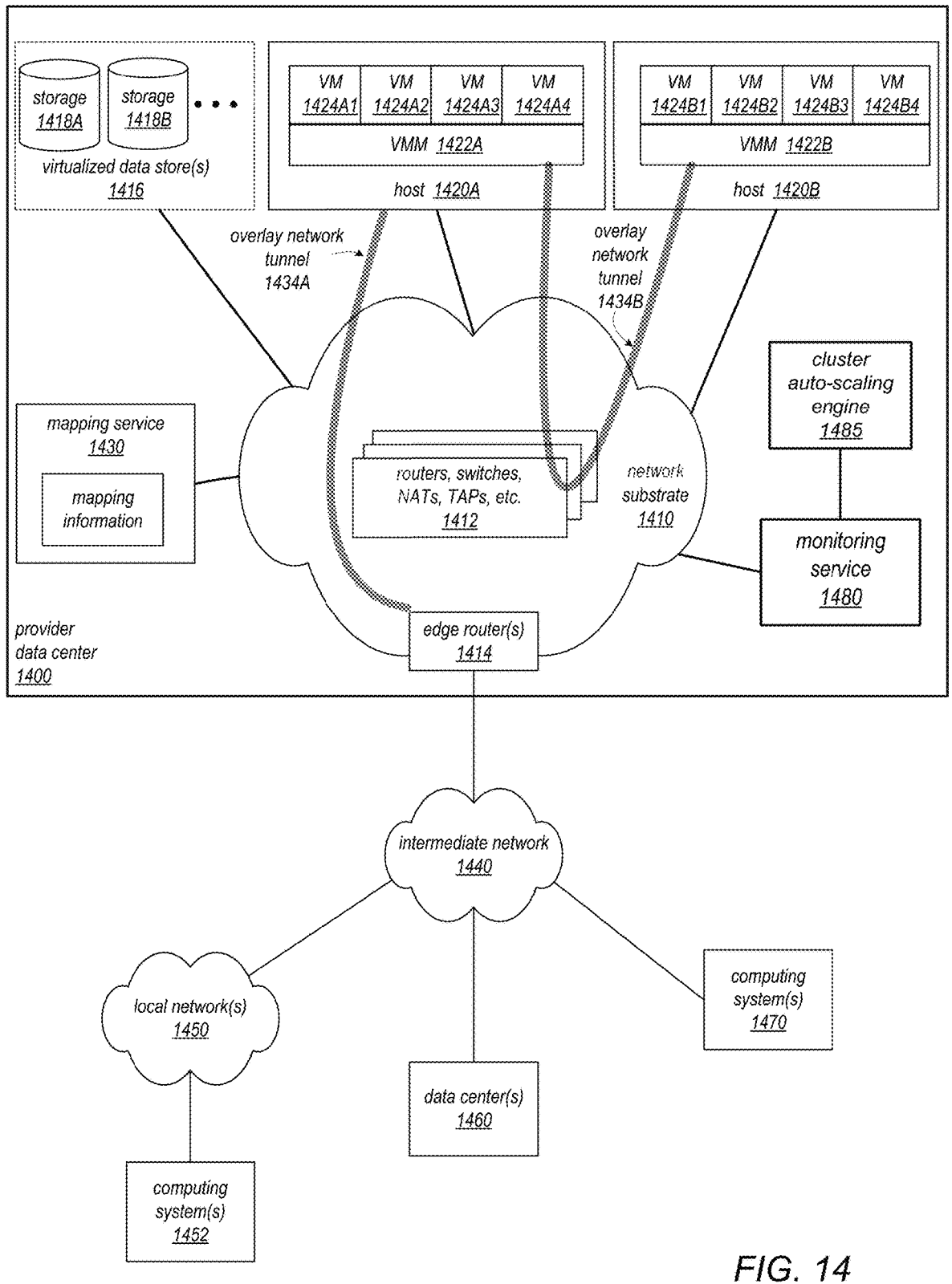
FIG. 14 illustrates an example data center that implements an overlay network on a network substrate using IP tunneling technology, according to some embodiments.

FIG. 14 illustrates an example data center that implements an overlay network on a network substrate using IP tunneling technology, according to at least some embodiments. A provider data center 1400 may include a network substrate that includes networking devices 1412 such as routers, switches, network address translators (NATs), and so on. At least some embodiments may employ an Internet Protocol (IP) tunneling technology to provide an overlay network via which encapsulated packets may be passed through network substrate 1410 using tunnels. The IP tunneling technology may provide a mapping and encapsulating system for creating an overlay network on a network (e.g., a local network in data center 1400 of FIG. 14) and may provide a separate namespace for the overlay layer (the public IP addresses) and the network substrate 1410 layer (the private IP addresses). Packets in the overlay layer may be checked against a mapping directory (e.g., provided by mapping service 1430) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1430) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 14, an example overlay network tunnel 1434A from a virtual machine (VM) 1424A on host 1420A to a device on the intermediate network 1440 (through edge router 1414) and an example overlay network tunnel 1434B between a VM 1424B on host 1420B and a VM 1424C on host 1420C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses. In some embodiments, an IP tunneling technology such as that illustrated in FIG. 14 may be employed when executing an application on a MapReduce cluster that implements cluster auto-scaling, as described herein.

Referring to FIG. 14, at least some networks in which embodiments may be implemented may include hardware virtualization technology that enables multiple operating systems to run concurrently on a host computer (e.g., hosts 1420A and 1420B of FIG. 14), i.e. as virtual machines (VMs) 1424 on the hosts 1420. The VMs 1424 may, for example, be rented or leased to clients of a network provider. A hypervisor, or virtual machine monitor (WM) 1422, on a host 1420 presents the VMs 1424 on the host with a virtual platform and monitors the execution of the VMs 1424. Each VM 1424 may be provided with one or more private IP addresses; the VMM 1422 on a host 1420 may be aware of the private IP addresses of the VMs 1424 on the host. A mapping service 1430 may be aware of all network IP prefixes and the IP addresses of routers or other devices serving IP addresses on the local network. This includes the IP addresses of the VMMs 1422 serving multiple VMs 1424. The mapping service 1430 may be centralized, for example on a server system, or alternatively may be distributed among two or more server systems or other devices on the network. A network may, for example, use the mapping service technology and IP tunneling technology to, for example, route data packets between VMs 1424 on different hosts 1420 within the data center 1400 network; note that an interior gateway protocol (IGP) may be used to exchange routing information within such a local network.

In addition, a network such as the provider data center 1400 network (which is sometimes referred to as an autonomous system (AS)) may use the mapping service technology, IP tunneling technology, and routing service technology to route packets from the VMs 1424 to Internet destinations, and from Internet sources to the VMs 1424. Note that an external gateway protocol (EGP) or border gateway protocol (BGP) is typically used for Internet routing between sources and destinations on the Internet. FIG. 14 shows an example provider data center 1400 implementing a network that provides resource virtualization technology and that provides full Internet access via edge router(s) 1414 that connect to Internet transit providers, according to at least some embodiments. The provider data center 1400 may, for example, provide clients the ability to implement virtual computing systems (VMs 1424) via a hardware virtualization service and the ability to implement virtualized data stores 1416 on storage resources 1418 via a storage virtualization service. Note that, in various embodiments, storage 1418 of virtualized data store 1416 may include object storage, block-based storage, and/or volume-based storage, as described herein.

The data center 1400 network may implement IP tunneling technology, mapping service technology, and a routing service technology to route traffic to and from virtualized resources, for example to route packets from the VMs 1424 on hosts 1420 in data center 1400 to Internet destinations, and from Internet sources to the VMs 1424. Internet sources and destinations may, for example, include computing systems 1470 connected to the intermediate network 1440 and computing systems 1452 connected to local networks 1450 that connect to the intermediate network 1440 (e.g., via edge router(s) 1414 that connect the network 1450 to Internet transit providers). The provider data center 1400 network may also route packets between resources in data center 1400, for example from a VM 1424 on a host 1420 in data center 1400 to other VMs 1424 on the same host or on other hosts 1420 in data center 1400.

A service provider that provides data center 1400 may also provide additional data center(s) 1460 that include hardware virtualization technology similar to data center 1400 and that may also be connected to intermediate network 1440. Packets may be forwarded from data center 1400 to other data centers 1460, for example from a VM 1424 on a host 1420 in data center 1400 to another VM on another host in another, similar data center 1460, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1418, as virtualized resources to clients of a network provider in a similar manner.

As illustrated in FIG. 14, in some embodiments, provider data center 1400 may include a monitoring service 1480 and/or a cluster auto-scaling engine 1485. For example, in some embodiments, monitoring service 1480 may be configured to gather and analyze metrics that are used in expressions representing auto-scaling trigger conditions or may gather such metrics and pass them to a separate auto-scaling rules engine for analysis, after which the auto-scaling rules engine may determine whether and when there is a need to perform auto-scaling actions (not shown). In some embodiments, distributed computing services provided by provider data center 1400 may be clients of monitoring service 1480. In some embodiments, cluster auto-scaling engine 1485 may be configured to perform any auto-scaling actions that are determined using the any of the auto-scaling techniques described herein. In some embodiments, the auto-scaling rules engine may be implemented within cluster auto-scaling engine 1485, rather than within monitoring service 1480.

Figure 15:
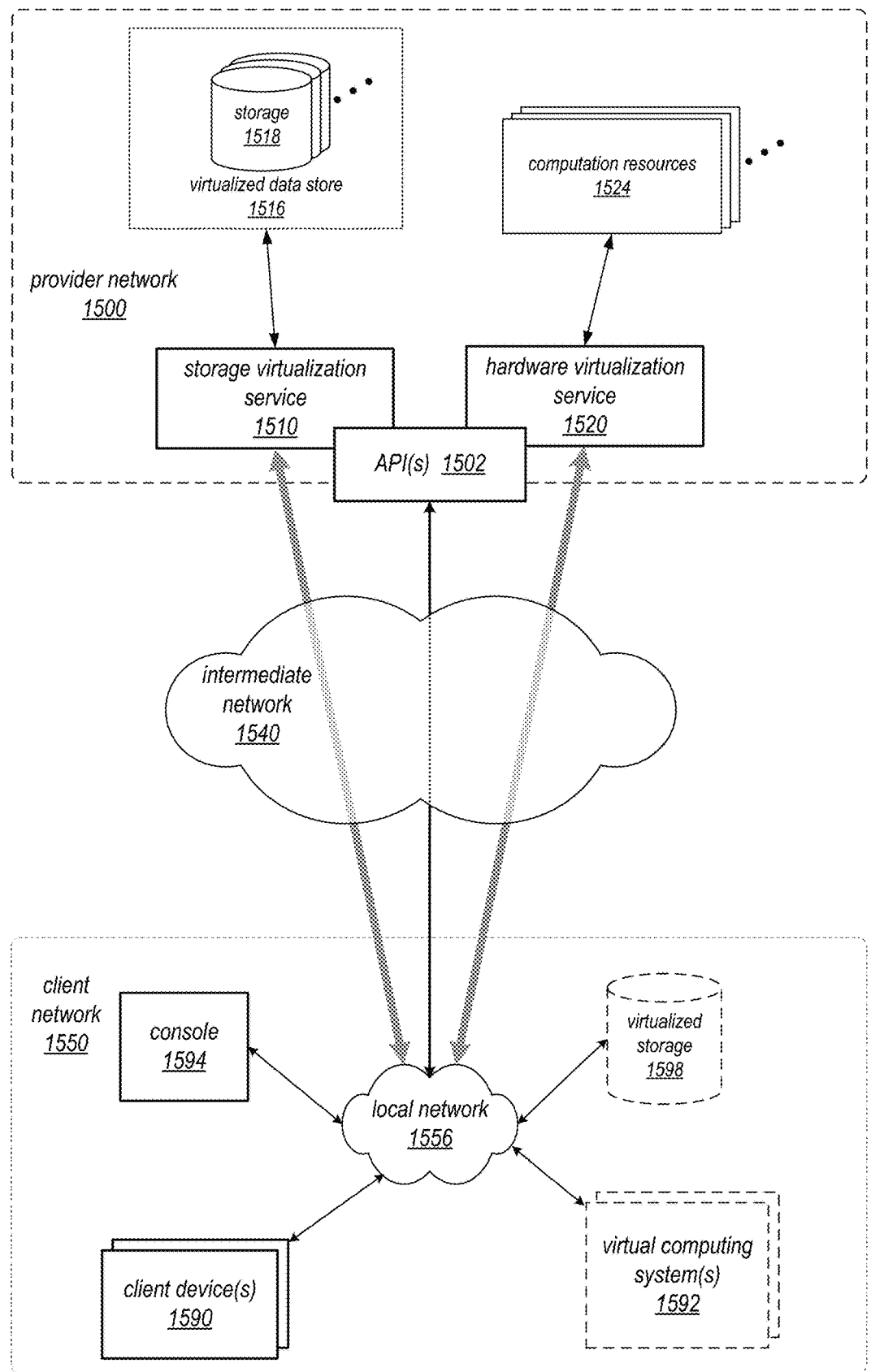
FIG. 15 is a block diagram of an example provider network that provides a storage virtualization service and a hardware virtualization service to clients, according to at least some embodiments.

FIG. 15 is a block diagram of an example provider network that provides a storage virtualization service and a hardware virtualization service to clients, according to at least some embodiments. Hardware virtualization service 1520 provides multiple computation resources 1524 (e.g., VMs) to clients. The computation resources 1524 may, for example, be rented or leased to clients of the provider network 1500 (e.g., to a client that implements client network 1550). Each computation resource 1524 may be provided with one or more private IP addresses. Provider network 1500 may be configured to route packets from the private IP addresses of the computation resources 1524 to public Internet destinations, and from public Internet sources to the computation resources 1524.

Provider network 1500 may provide a client network 1550, for example coupled to intermediate network 1540 via local network 1556, the ability to implement virtual computing systems 1592 via hardware virtualization service 1520 coupled to intermediate network 1540 and to provider network 1500. In some embodiments, hardware virtualization service 1520 may provide one or more APIs 1502, for example a web services interface, via which a client network 1550 may access functionality provided by the hardware virtualization service 1520, for example via a console 1594. In at least some embodiments, at the provider network 1500, each virtual computing system 1592 at client network 1550 may correspond to a computation resource 1524 that is leased, rented, or otherwise provided to client network 1550.

From an instance of a virtual computing system 1592 and/or another client device 1590 or console 1594, the client may access the functionality of storage virtualization service 1510, for example via one or more APIs 1502, to access data from and store data to a virtualized data store 1516 provided by the provider network 1500. In some embodiments, a virtualized data store gateway (not shown) may be provided at the client network 1550 that may locally cache at least some data, for example frequently accessed or critical data, and that may communicate with virtualized data store service 1510 via one or more communications channels to upload new or modified data from a local cache so that the primary store of data (virtualized data store 1516) is maintained. In at least some embodiments, a user, via a virtual computing system 1592 and/or on another client device 1590, may mount and access virtualized data store 1516 volumes, which appear to the user as local virtualized storage 1598. Note that, in various embodiments, storage 1518 of virtualized data store 1516 may include object storage, block-based storage, and/or volume-based storage, as described herein.

While not shown in FIG. 15, the virtualization service(s) may also be accessed from resource instances within the provider network 1500 via API(s) 1502. For example, a client, appliance service provider, or other entity may access a virtualization service from within a respective private network on the provider network 1500 via an API 1502 to request allocation of one or more resource instances within the private network or within another private network.

Note that, although no monitoring components or auto-scaling rules engines are shown in FIG. 15, such components may be implemented within the control plane of storage virtualization service 1510 and/or hardware virtualization service 1520, in some embodiments. In other embodiments, such components may be implemented as part of a separate auto-scaling service on provider network 1500, and the virtualization services 1510 and/or 1520 may be clients of such a service.

FIG. 16 illustrates an example provider network that provides private networks on the provider network to at least some clients, according to at least some embodiments. A client's virtualized private network 1660 on a provider network 1600, for example, enables a client to connect their existing infrastructure (e.g., devices 1652) on client network 1650 to a set of logically isolated resource instances (e.g., VMs 1624A and 1624B and storage 1618A and 1618B), and to extend management capabilities such as security services, firewalls, and intrusion detection systems to include their resource instances.

A client's virtualized private network 1660 may be connected to a client network 1650 via a private communications channel 1642. A private communications channel 1642 may, for example, be a tunnel implemented according to a network tunneling technology or some other peering connection over an intermediate network 1640. The intermediate network may, for example, be a shared network or a public network such as the Internet. Alternatively, a private communications channel 1642 may be implemented over a direct, dedicated connection between virtualized private network 1660 and client network 1650.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1660 for a client on provider network 1600, one or more resource instances (e.g., VMs 1624A and 1624B and storage 1618A and 1618B) may be allocated to the virtualized private network 1660. Note that other resource instances (e.g., storage 1618C and VMs 1624C) may remain available on the provider network 1600 for other client usage. A range of public IP addresses may also be allocated to the virtualized private network 1660. In addition, one or more networking devices (routers, switches, etc.) of the provider network 1600 may be allocated to the virtualized private network 1660. A private communications channel 1642 may be established between a private gateway 1662 at virtualized private network 1660 and a gateway 1656 at client network 1650.

In at least some embodiments, in addition to, or instead of, a private gateway 1662, virtualized private network 1660 may include a public gateway 1664 that enables resources within virtualized private network 1660 to communicate directly with entities (e.g., network entity 1644) via intermediate network 1640, and vice versa, instead of or in addition to via private communications channel 1642.

Virtualized private network 1660 may be, but is not necessarily, subdivided into two or more subnets 1670. For example, in implementations that include both a private gateway 1662 and a public gateway 1664, the private network may be subdivided into a subnet 1670A that includes resources (VMs 1624A and storage 1618A, in this example) reachable through private gateway 1662, and a subnet 1670B that includes resources (VMs 1624B and storage 1618B, in this example) reachable through public gateway 1664.

The client may assign particular client public IP addresses to particular resource instances in virtualized private network 1660. A network entity 1644 on intermediate network 1640 may then send traffic to a public IP address published by the client; the traffic is routed, by the provider network 1600, to the associated resource instance. Return traffic from the resource instance is routed, by the provider network 1600, back to the network entity 1644 over intermediate network 1640. Note that routing traffic between a resource instance and a network entity 1644 may require network address translation to translate between the public IP address and the private IP address of the resource instance.

At least some embodiments may allow a client to remap public IP addresses in a client's virtualized private network 1660 as illustrated in FIG. 16 to devices on the client's external network 1650. When a packet is received (e.g., from network entity 1644), the network 1600 may determine that the destination IP address indicated by the packet has been remapped to an endpoint on external network 1650 and handle routing of the packet to the respective endpoint, either via private communications channel 1642 or via the intermediate network 1640. Response traffic may be routed from the endpoint to the network entity 1644 through the provider network 1600, or alternatively may be directly routed to the network entity 1644 by the client network 1650. From the perspective of the network entity 1644, it appears as if the network entity 1644 is communicating with the public IP address of the client on the provider network 1600. However, the network entity 1644 has actually communicated with the endpoint on client network 1650.

While FIG. 16 shows network entity 1644 on intermediate network 1640 and external to provider network 1600, a network entity may be an entity on provider network 1600. For example, one of the resource instances provided by provider network 1600 may be a network entity that sends traffic to a public IP address published by the client.

Note that, although no monitoring components or auto-scaling rules engines are shown in FIG. 16 such components may be implemented within the control plane of storage virtualization service 1630 and/or hardware virtualization service 1635, in some embodiments. In other embodiments, such components may be implemented as part of a separate auto-scaling service on provider network 1600, and the virtualization services 1630 and/or 1635 may be clients of such a service.

Illustrative System

Figure 17:
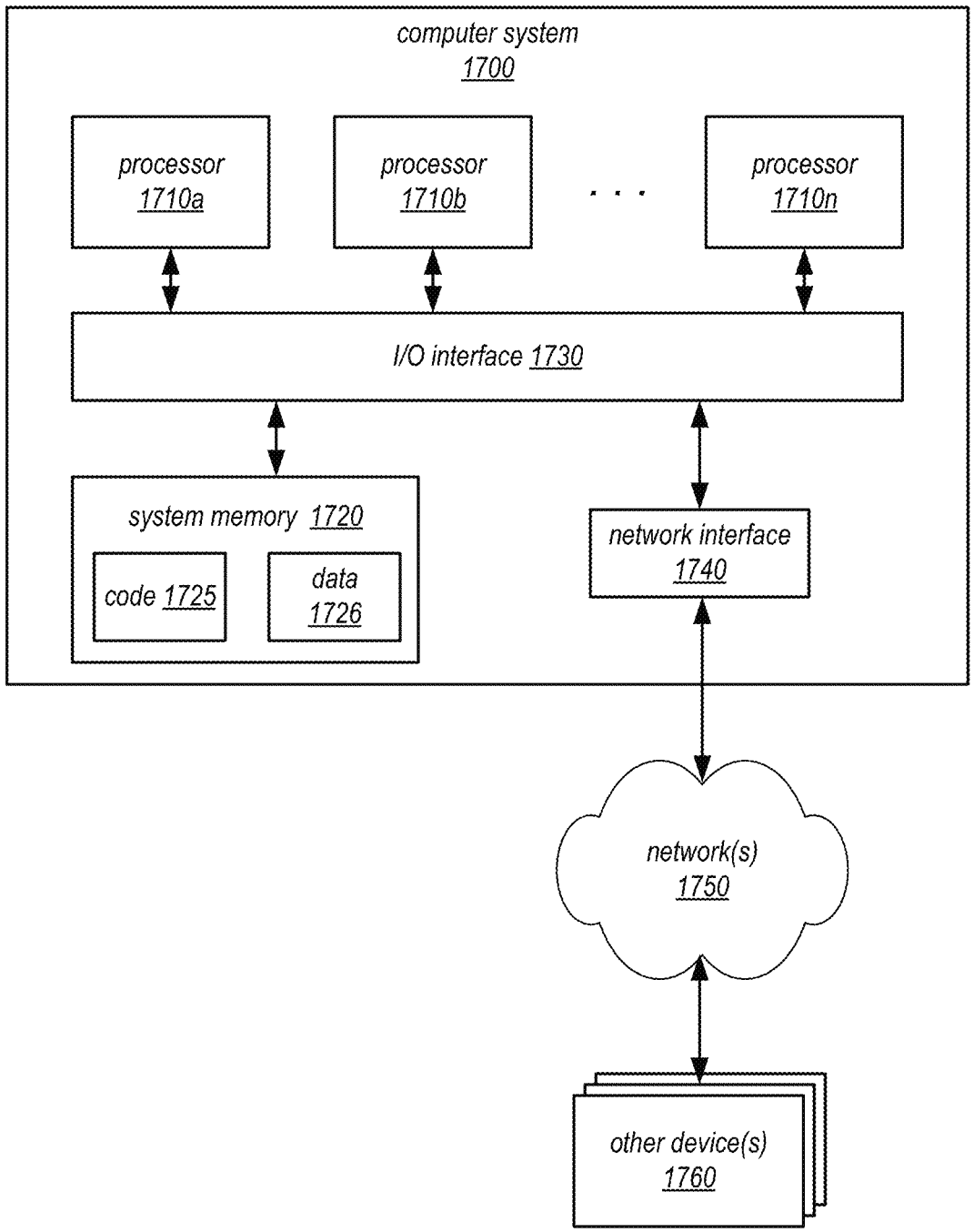
FIG. 17 is a block diagram illustrating an example computer system that is configured to implement the techniques described herein, according to at least some embodiments.

In at least some embodiments, a computing environment that implements a portion or all of the methods and apparatus described herein may include a general-purpose computer system that includes or is configured to access one or more computer-accessible media, such as computer system 1700 illustrated in FIG. 17. For example, in various embodiments, computer system 1700 may represent a master node or worker node of a distributed computation system (e.g., a MapReduce cluster), a node of an object storage service, block-based storage service, or volume-based storage service, a computing node on a service provider system that implements cluster auto-scaling, a client computing system, or any other type of computer system that may be employed to implement the methods and apparatus described herein. In the illustrated embodiment, computer system 1700 includes one or more processors 1710 coupled to a system memory 1720 via an input/output (I/O) interface 1730. Computer system 1700 further includes a network interface 1740 coupled to I/O interface 1730.

In various embodiments, computer system 1700 may be a uniprocessor system including one processor 1710, or a multiprocessor system including several processors 1710 (e.g., two, four, eight, or another suitable number). Processors 1710 may be any suitable processors capable of executing instructions. For example, in various embodiments, processors 1710 may be general-purpose or embedded processors implementing any of a variety of instruction set architectures (ISAs), such as the x86, PowerPC, SPARC, or MIPS ISAs, or any other suitable ISA. In multiprocessor systems, each of processors 1710 may commonly, but not necessarily, implement the same ISA.

System memory 1720 may be configured to store instructions and data accessible by processor(s) 1710. In various embodiments, system memory 1720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the methods and apparatus described herein, are shown stored within system memory 1720 as code 1725 and data 1726. For example, at various times, data 1726 in system memory 1720 may include one or more of a data set (or portion thereof) that is to processed by a HPC application or computation (e.g., a MapReduce application), output data that is produced by such an application, key pairs, hostfiles, rankfiles, or configuration or operating parameters for a MapReduce job, or any other information usable when executing such applications. In another example, at various times, code 1725 in system memory 1720 may include program instructions that are executable to implement a MapReduce application (or any portion thereof), an operating system or virtual machine monitor, library or utility functions, an API or service interface, or any other program instructions that are executable to perform the methods described herein.

In one embodiment, I/O interface 1730 may be configured to coordinate I/O traffic between processor 1710, system memory 1720, and any peripheral devices in the device, including network interface 1740 or other peripheral interfaces. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processor 1710.

Network interface 1740 may be configured to allow data to be exchanged between computer system 1700 and other devices 1760 attached to a network or networks 1750, such as other computer systems (e.g., computer systems similar to computer system 1700 or computer systems that include more, fewer, or different components than computer system 1700) or devices as illustrated and described in FIGS. 1 through 16, for example. For example, in some embodiments, computer system 1700 may represent a node of a cluster-based DCS (e.g., a MapReduce cluster) that implements auto-scaling, as described herein, and network interface 1740 may be configured to allow data to be exchanged between computer system 1700 and devices that implement an object data storage service, block-based storage service, or a volume-based storage service. In various embodiments, network interface 1740 may support communication via any suitable wired or wireless general data networks, such as types of Ethernet network, for example. Additionally, network interface 1740 may support communication via telecommunications/telephony networks such as analog voice networks or digital fiber communications networks, via storage area networks such as Fibre Channel SANs, or via any other suitable type of network and/or protocol.

In some embodiments, system memory 1720 may be one embodiment of a computer-accessible medium configured to store program instructions and data as described above for FIGS. 1 through 16 for implementing embodiments of methods and apparatus as described herein. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1700 via I/O interface 1730. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1700 as system memory 1720 or another type of memory. Further, a computer-accessible medium may include transmission media or signals such as electrical, electromagnetic, or digital signals, conveyed via a communication medium such as a network and/or a wireless link, such as may be implemented via network interface 1740.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A method, comprising:
  performing, by one or more computers:
    implementing an interface configured to provide for selection of a type of condition from among a plurality of different types of conditions available for an automatic scaling policy associated with a cluster of nodes comprising two or more non-overlapping instance groups, each instance group comprising a respective one or more computing resource instances, the types of conditions available for selection comprising a workload-based condition and a time-based condition;

receiving, via the interface, one or more inputs from a client:
    selecting from among the workload-based condition or the time-based condition for the automatic scaling policy, and
    associating the automatic scaling policy that specifies the selected condition with the cluster of nodes;
detecting that a trigger condition, comprising the workload-based condition or the time-based condition, specified in the automatic scaling policy, has been met during execution of a distributed application on the cluster of nodes; and
in response to said detecting, performing an automatic scaling operation comprising one of a workload-based auto-scale or a time-based auto-scale, as specified by the corresponding condition specified in the automatic scaling policy, on one of the two or more non-overlapping instance groups, the one of the two or more non-overlapping instance groups specified by the automatic scaling policy, wherein the automatic scaling operation changes a number of computing resource instances on the one of the two or more non-overlapping instance groups.

2. The method of claim 1,
wherein the trigger condition for workload-based auto-scale comprises an expression that, when evaluated true, triggers the performance of the automatic scaling operation on the one of the two or more non-overlapping instance groups executing the distributed application, and wherein the expression is dependent on one or more metrics generated during execution of the distributed application on the cluster of nodes.

3. The method of claim 1,
wherein the trigger condition comprising the time-based condition comprises an expression that, when evaluated true, triggers the performance of the automatic scaling operation comprising the time-based auto-scale on the one of the two or more non-overlapping instance groups, and wherein the expression is dependent on a day of the week, a date, a time of day, an elapsed period of time, or an estimated period of time.

4. The method of claim 1, further comprising:
receiving input associating another automatic scaling policy with another one of the two or more non-overlapping instance groups executing the distributed application, wherein the other automatic scaling policy defines a second trigger condition that, when met, triggers the performance of a second automatic scaling operation comprising another workload-based auto-scale on the other one of the two or more non-overlapping instance groups that changes the number of computing resource instances in the other one of the two or more non-overlapping instance groups;
detecting, during execution of the distributed application on the cluster of nodes, that the second trigger condition has been met; and
in response to detecting that the second trigger condition has been met, initiating performance of the second automatic scaling operation on the other one of the two or more non-overlapping instance groups executing the distributed application.

5. The method of claim 1,
wherein the automatic scaling operation comprises an operation to add capacity to the one of the two or more non-overlapping instance groups executing the distributed application.

6. The method of claim 1,
wherein the automatic scaling operation comprises an operation to remove capacity from the one of the two or more non-overlapping instance groups executing the distributed application, wherein removing capacity comprises decommissioning at least one node of the cluster of nodes.

7. The method of claim 6, wherein the method further comprises:
determining which of the one or more of the computing resource instances to remove from the one of the two or more non-overlapping instance groups executing the distributed application;
removing the determined one or more of the computing resource instances from the one of the two or more non-overlapping instance groups executing the distributed application; and
wherein said determining is dependent on one or more of:
    determining that one of the computing resource instances in the one of the two or more non-overlapping instance groups stores data that would be lost if the computing resource instance were removed,
    determining that removal of one of the computing resource instances in the one of the two or more non-overlapping instance groups would result in a replication requirement or quorum requirement not being met,
    determining that one of the computing resource instances in the one of the two or more non-overlapping instance groups has been decommissioned,
    determining that one of the computing resource instances in the one of the two or more non-overlapping instance groups is currently executing a task on behalf of the distributed application, or
    determining progress of a task that is currently executing on one of the computing resource instances in the one of the two or more non-overlapping instance groups.

8. A system, comprising:
one or more processors and memory configured to:
    implement an interface configured to provide for selection of a type of condition from among a plurality of different types of conditions available for an automatic scaling policy associated with a cluster of nodes comprising two or more non-overlapping instance groups, each non-overlapping instance group comprising a respective one or more computing resource instances, the types of conditions available for selection comprising a workload-based condition and a time-based condition;
    receive, via the interface, one or more inputs from a client indicating:
        selection from among the workload-based condition or the time-based condition for the automatic scaling policy, and
        association of the automatic scaling policy that specifies the selected condition with the cluster of nodes
    detect that a trigger condition, comprising the workload-based condition or the time-based condition, specified in the automatic scaling policy, has been met during execution of a distributed application on the cluster of nodes; and
    in response to said detect, perform an automatic scaling operation comprising one of a workload-based auto-scale or a time-based auto-scale, as specified by the corresponding condition specified in the automatic scaling policy, on one of the two or more non-overlapping instance groups, the one of the two or more non-overlapping instance groups specified by the automatic scaling policy, wherein the automatic scaling operation changes a number of computing resource instances on the one of the two or more non-overlapping instance groups.

9. The system of claim 8, wherein the trigger condition for workload-based auto-scale comprises an expression that, when evaluated true, triggers the performance of the automatic scaling operation on the one of the two or more non-overlapping instance groups, and wherein the expression is dependent on one or more metrics generated during execution of the distributed application on the cluster of nodes.

10. The system of claim 8, wherein the trigger condition for time-based auto-scale comprises an expression that, when evaluated true, triggers the performance of the automatic scaling operation on the one of the two or more non-overlapping instance groups, and wherein the expression is dependent on a day of the week, a date, a time of day, an elapsed period of time, or an estimated period of time.

11. The system of claim 8, wherein the one or more processors and memory are further configured to:
receive input associating another automatic scaling policy with another one of the two or more non-overlapping instance groups, wherein the other automatic scaling policy defines a second trigger condition that, when met, triggers the performance of a second automatic scaling operation comprising another workload-based auto-scale on the other one of the two or more non-overlapping instance groups that changes the number of computing resource instances in the other one of the two or more non-overlapping instance groups;
detect, during execution of the distributed application on the cluster of nodes, that the second trigger condition has been met; and
in response to detecting that the second trigger condition has been met, initiate performance of the second automatic scaling operation on the other one of the two or more non-overlapping instance groups.

12. The system of claim 8,
wherein the automatic scaling operation comprises an operation to add capacity to the one of the two or more non-overlapping instance groups.

13. The system of claim 8,
wherein the automatic scaling operation comprises an operation to remove capacity from the one of the two or more non-overlapping instance groups, wherein removing capacity comprises decommissioning at least one node of the cluster of nodes.

14. The system of claim 13, wherein the one or more processors and memory are further configured to:
determine which of the at least one node to remove from the one of the two or more non-overlapping instance groups;
remove the determined node from the cluster of nodes; and
wherein said determination is dependent on one or more of:
a determination that one of the nodes in the cluster of nodes stores data that would be lost if the one of the nodes were removed,
a determination that removal of one of the nodes of the cluster of nodes would result in a replication requirement or quorum requirement not being met,
a determination that one of the nodes of the cluster of nodes has been decommissioned,
a determination that one of the nodes of the cluster of nodes is currently executing a task on behalf of the distributed application, or determination of progress of a task that is currently executing on one of the nodes of the cluster of nodes.

15. One or more non-transitory computer-accessible storage media storing program instructions that when executed on or across one or more computers cause the one or more computers to implement a distributed computing service configured to:
implement an interface configured to provide for selection of a type of condition from among a plurality of different types of conditions available for an automatic scaling policy associated with a cluster of nodes comprising two or more non-overlapping instance groups, each instance group comprising a respective one or more computing resource instances, the types of conditions available for selection comprising a workload-based condition and a time-based condition;
receive, via the interface, one or more inputs from a client indicating:
selection from among the workload-based condition or the time-based condition for the automatic scaling policy, and
association of the automatic scaling policy that specifies the selected condition with the cluster of nodes;
detect that a trigger condition, specified in the automatic scaling policy and comprising the workload-based condition or the time-based condition, has been met during execution of a distributed application on the cluster of nodes; and
in response to said detect, perform an automatic scaling operation comprising one of a workload-based auto-scale or a time-based auto-scale, as specified by the corresponding condition specified in the automatic scaling policy, on one of the two or more non-overlapping instance groups, the one of the two or more non-overlapping instance groups specified by the automatic scaling policy, wherein the automatic scaling operation changes a number of computing resource instances on the one of the two or more non-overlapping instance groups.

16. The one or more non-transitory computer-accessible storage media of claim 15, wherein the trigger condition comprises an expression that, when evaluated true, triggers the performance of workload-based auto-scale on the one of the two or more non-overlapping instance groups, and wherein the expression is dependent on one or more metrics generated during execution of the distributed application on the cluster of nodes.

17. The one or more non-transitory computer-accessible storage media of claim 15, wherein the trigger condition comprising the time-based condition comprises an expression that, when evaluated true, triggers the performance of time-based auto-scale operation on the one of the two or more non-overlapping instance groups, and wherein the expression is dependent on a day of the week, a date, a time of day, an elapsed period of time, or an estimated period of time.

18. The one or more non-transitory computer-accessible storage media of claim 15, wherein the distributed computing service is further configured to:
receive input associating another automatic scaling policy, with another one of the two or more non-overlapping instance groups, wherein the other automatic scaling policy defines a second trigger condition that, when met, triggers the performance of a second automatic scaling operation on the other one of the two or more non-overlapping instance groups that changes the number of computing resource instances in the other one of the two or more non-overlapping instance groups;

detect, during execution of the distributed application on the cluster, that the second trigger condition has been met; and in response to detecting that the second trigger condition has been met, initiate performance of the second automatic scaling operation comprising one of workload-based auto-scale or time-based auto-scale on the other one of the two or more non-overlapping instance groups.

19. The one or more non-transitory computer-accessible storage media of claim 15, wherein the automatic scaling operation comprises an operation to add capacity to the one of the two or more non-overlapping instance groups.

20. The one or more non-transitory computer-accessible storage media of claim 15, wherein the automatic scaling operation comprises an operation to remove capacity from the one of the two or more non-overlapping instance groups comprising an operation to remove one or more nodes of the cluster of nodes.

* * * * *